(12) United States Patent
Rowse et al.

(10) Patent No.: US 7,540,139 B2
(45) Date of Patent: Jun. 2, 2009

(54) FOLDABLE HAY RAKE

(75) Inventors: Dan D Rowse, Ord, NE (US); Rodney D Rowse, O'Neill, NE (US)

(73) Assignee: Rowse Hydraulic Rakes Co., Inc., Burwell, NE (US)

( * ) Notice: Subject to any disclaimer, the term of this patent is extended or adjusted under 35 U.S.C. 154(b) by 887 days.

(21) Appl. No.: 10/985,232

(22) Filed: Nov. 10, 2004

(65) Prior Publication Data
US 2006/0032631 A1    Feb. 16, 2006

Related U.S. Application Data

(60) Provisional application No. 60/602,031, filed on Aug. 16, 2004.

(51) Int. Cl.
*A01D 76/00* (2006.01)
(52) U.S. Cl. .................................................. 56/377
(58) Field of Classification Search .................. 56/377, 56/365, 367, 370, 375, 378, 380
See application file for complete search history.

(56) References Cited

U.S. PATENT DOCUMENTS

| | | | |
|---|---|---|---|
| 2,807,927 A * | 10/1957 | van der Lely et al. | 56/377 |
| 3,279,160 A * | 10/1966 | Worrel | 56/377 |
| 4,214,428 A | 7/1980 | Caraway | |
| 4,723,401 A | 2/1988 | Webster et al. | |
| 4,723,402 A | 2/1988 | Webster et al. | |
| 4,753,063 A | 6/1988 | Buck | |
| D298,139 S * | 10/1988 | van Staveren | D15/27 |
| 4,932,197 A * | 6/1990 | Allen | 56/377 |
| 4,974,407 A | 12/1990 | Rowe et al. | |
| 4,977,734 A | 12/1990 | Rowe et al. | |
| 5,062,260 A * | 11/1991 | Tonutti | 56/380 |
| 5,263,306 A | 11/1993 | Tonutti | |
| 5,685,135 A * | 11/1997 | Menichetti | 56/365 |
| 5,752,375 A * | 5/1998 | Tonutti | 56/365 |
| 5,899,055 A | 5/1999 | Rowse et al. | |
| 5,956,934 A * | 9/1999 | Wright et al. | 56/377 |
| 5,966,916 A | 10/1999 | Laing | |
| 6,109,012 A * | 8/2000 | Staal et al. | 56/367 |
| 6,179,315 B1 * | 1/2001 | Boriack | 280/419 |
| 6,463,726 B1 | 10/2002 | Helfer et al. | |
| 6,467,249 B2 | 10/2002 | Demanet | |

* cited by examiner

*Primary Examiner*—Alicia M Torres

(57) ABSTRACT

A foldable hay rake has two rake arms comprised of first and second rake arm structures with rake wheels thereon pivotally secured to a base frame to pivot in a vertical plane. A center rake arm structure is pivotally associated with the base frame with a center rake arm frame located adjacent a rearward end of the base frame between the first and second rake arm structures. At least one of the hay rake wheels has a plurality of teeth extending therefrom with a tooth spacing between adjacent teeth of less than five inches and an outer diameter greater than 60 inches. A castor wheel is pivotally attached to the outer end of the main support frame, with an axle dampener operationally associated with the castor wheel to dampen wobbling of the castor wheel.

25 Claims, 30 Drawing Sheets

FOLDABLE HAY RAKE

CROSS REFERENCE TO RELATED APPLICATION

This application claims the benefit of U.S. Provisional Application No. 60/602,031, filed Aug. 16, 2004.

FIELD OF THE INVENTION

This invention relates to large foldable hay rakes that can move through a hay field of cut hay in a swath up to 40 feet wide or greater to turn the hay and present the hay in elongated windrows ready for harvesting or baling, usually in large round or square bales weighing almost a ton or more.

BACKGROUND OF THE INVENTION

This invention is an improvement over prior and existing large foldable hay rakes such as that shown in U.S. Pat. No. 5,899,055.

Existing foldable hay rakes typically have a pair of wheel supported elongated rake arms that are pivotal along their lengths, and capable of being pivoted individually with respect to each other. While substantially advancing the art of hay raking, these devices have certain shortcomings. Among them are that the rakes are cumbersome to use both in operation and for travel; they require substantial room for turning and maneuvering; they do not adapt well to uneven ground; they are susceptible to damage in the field, and they do not always cover the field well to deal with all the hay that is being raked.

Further, existing foldable hay rakes typically have an actuating rod or lift tube that runs alongside and is supported by the rake arms. Individual raking wheels are mounted to the rake arms and are connected to the lift tube such that when the lift tube is translationally shifted relative to the rake arms, the raking wheels are either lifted or lowered. Specifically, existing foldable hay rakes utilize a hydraulic cylinder mounted to the end of the rake arm extension and connected to the lift tube. When the cylinder rod is retracted, the raking wheels are engaged with the ground surface. The cylinder rod extends to effectively push the lift tube from the rearward end of the lift tube and raise the individual raking wheels from the ground surface. The problem with existing foldable hay rakes is that pushing from the rearward end of the lift tube to raise the individual raking wheels often bends or damages the lift tube.

Also, with larger diameter rake wheels exceeding 60 inches in outside diameter, the teeth are spaced greater than four inches apart which causes problems raking fine hay and leads to a loss in yield.

Another problem with existing foldable hay rakes is that they leave a path in the center of the raking machine where hay is turned in for bailing that remains unraked. This unraked portion that lies underneath the turned in portion is more difficult to pick up during harvesting or baling leading to lost yields and reduced growth in future harvests.

It is therefore a principal object of this invention to provide a foldable hay rake that will overcome the foregoing problems, and which will enhance the performance and efficiency of raking hay.

Another object of this invention is to provide a foldable hay rake that can be easily observed from the towing tractor while in operation, and which can individually rake and turn separate rows of cut hay, or to combine such rows into a single row for baling.

A further object of this invention is to provide a foldable hay rake with a center kicker wheel assembly.

A still further object of this invention is to provide an axle dampener for dampening the wobbling of a castor wheel.

Another object of this invention is to provide a hay rake wheel with improved physical characteristics for efficiently raking hay.

These and other objects will be apparent to those skilled in the art.

SUMMARY OF THE INVENTION

A foldable hay rake has two rake arms comprised of first and second rake arm structures with rake wheels thereon pivotally secured to a base frame to pivot in a vertical plane. A center rake arm structure is pivotally associated with the base frame with a center rake arm frame located adjacent a rearward end of the base frame between the first and second rake arm structures. At least one of the hay rake wheels has a plurality of teeth extending therefrom with a tooth spacing between adjacent teeth of less than five inches and an outer diameter greater than 60 inches. A castor wheel is pivotally attached to the outer end of the main support frame, with an axle dampener operationally associated with the castor wheel to dampen wobbling of the castor wheel.

DESCRIPTION OF THE PREFERRED EMBODIMENTS

Figure 5:
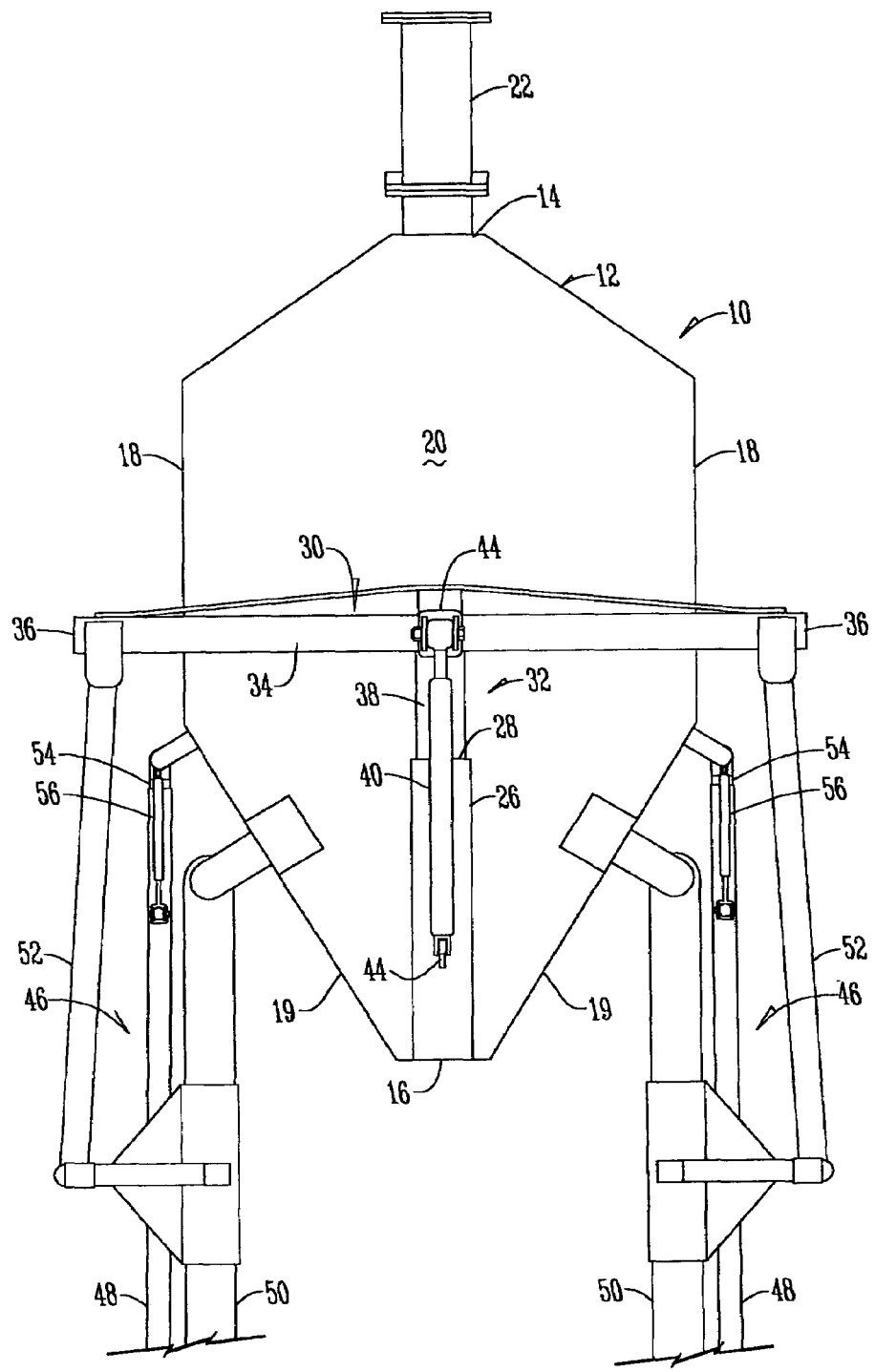
FIG. 5 is an enlarged scale plan view of the base frame of this invention while in the travel mode of FIG. 1.
Figure 17:
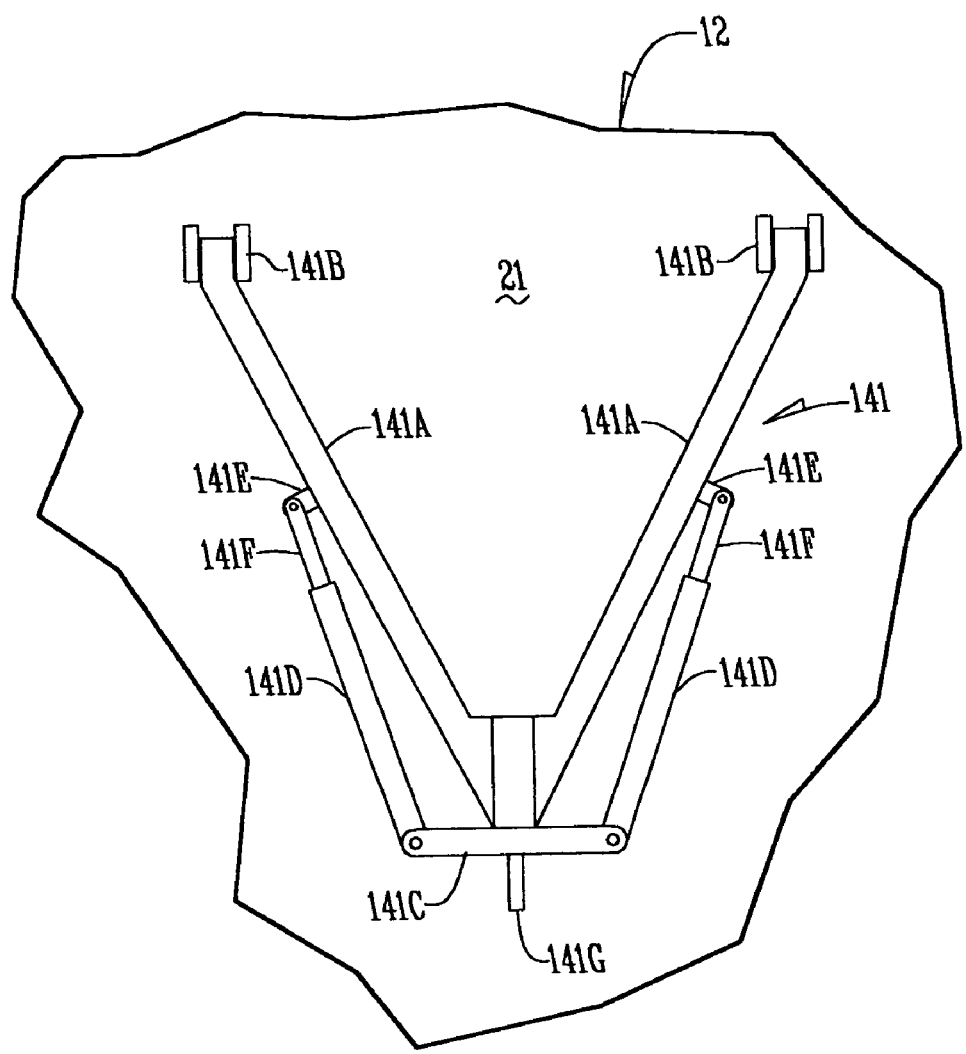
FIG. 17 is a bottom plan view of the stabilizer frame of the invention.
Figure 18:
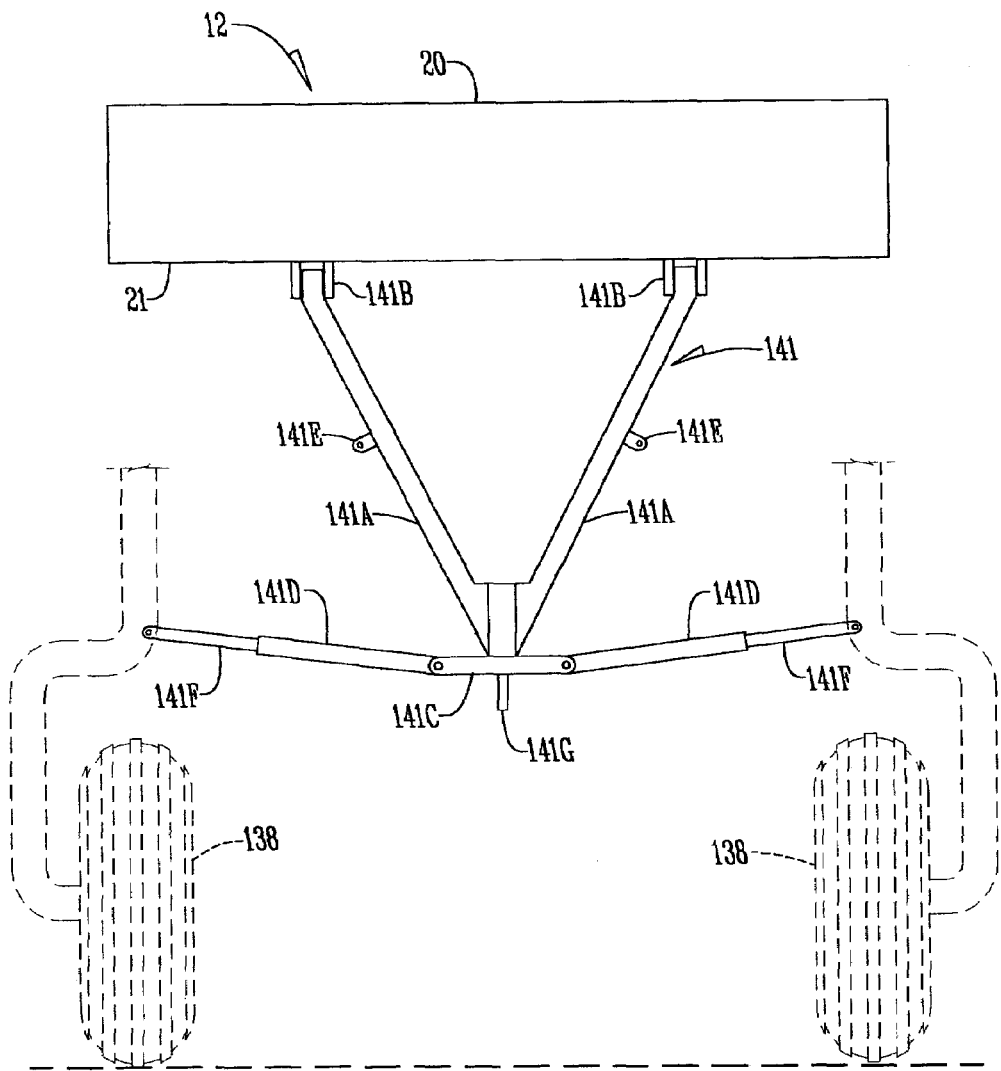
FIG. 18 is a forward elevational view of the stabilizer frame of FIG. 17 in its lowered operational condition.

The hay rake 10 has a base frame 12 which is normally in a substantially horizontal position. (FIG. 5). Base frame 12 has a forward end 14, a rearward end 16, parallel sides 18, diagonal sides 19, an upper flat deck 20, and a bottom plate 21 (FIGS. 17, 18). A tongue 22 is rigidly secured to the forward end 14 and extends downwardly and forwardly to be connected to the drawbar of a conventional farm tractor 24.

With reference to FIGS. 5-8, a hollow guide housing 26 is rigidly secured to and extends from the rearward end of base frame 12 in a forward direction along the centerline of the base frame and terminates at an open forward end 28. A T-beam 30 comprised of a forwardly extending beam 32 is slidably mounted in housing 26 with its forward end terminating in a transverse forward beam 34 with outer ends 36. The beam 32 is covered with a layer of vinyl plastic 38 or the like to enhance the sliding movement of beam 32 in housing 26 without the need for lubrication.

Figure 6:
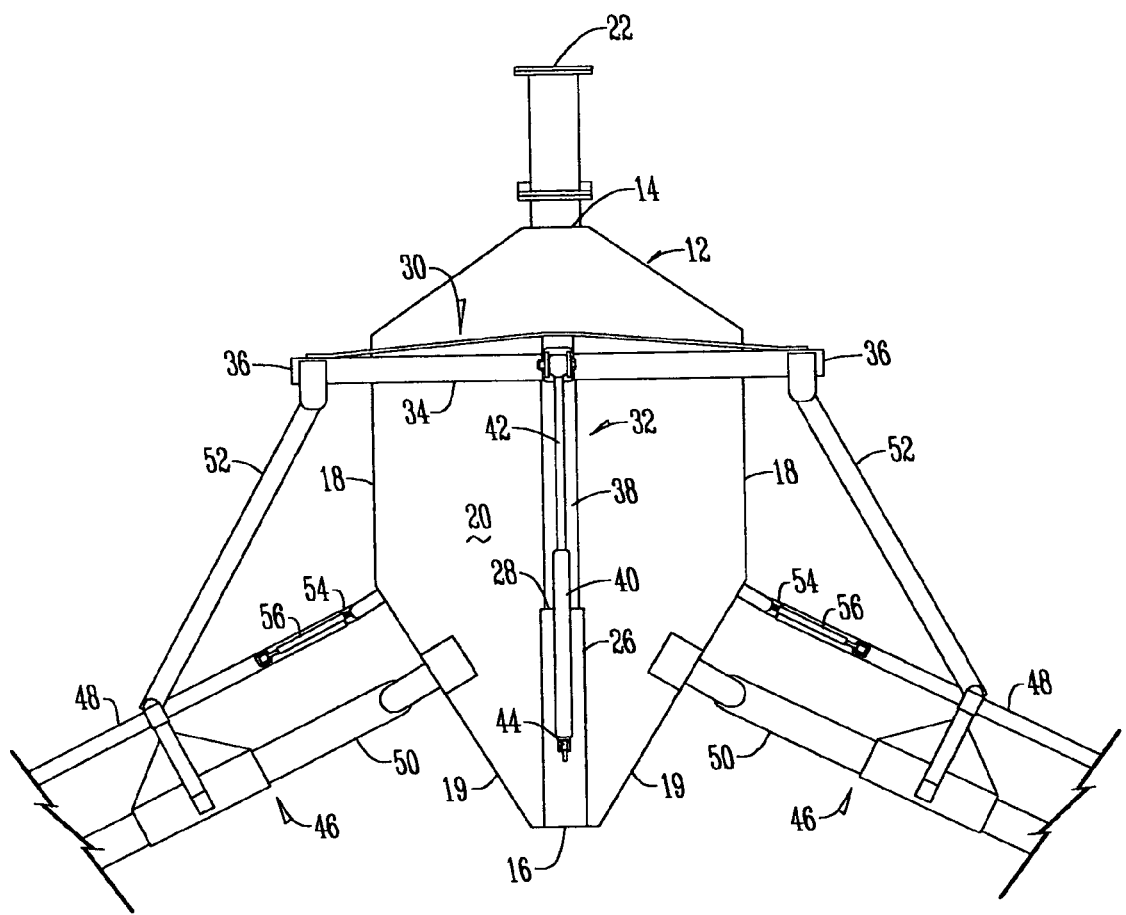
FIG. 6 is a plan view similar to that of FIG. 5 but shows the base frame in the positions of FIG. 2 and FIG. 3.
Figure 7:
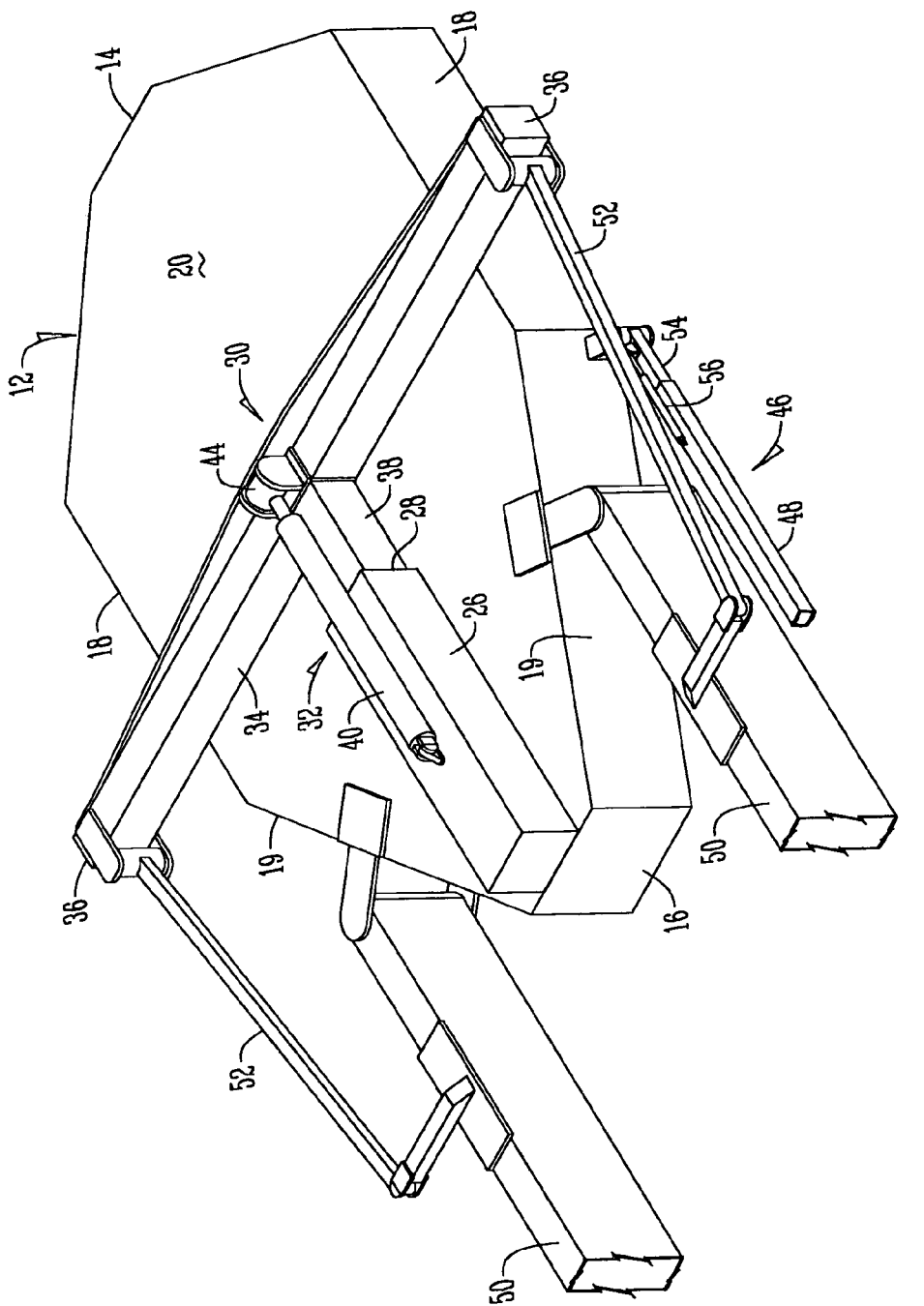
FIG. 7 is a side perspective view of FIG. 5.
Figure 8:
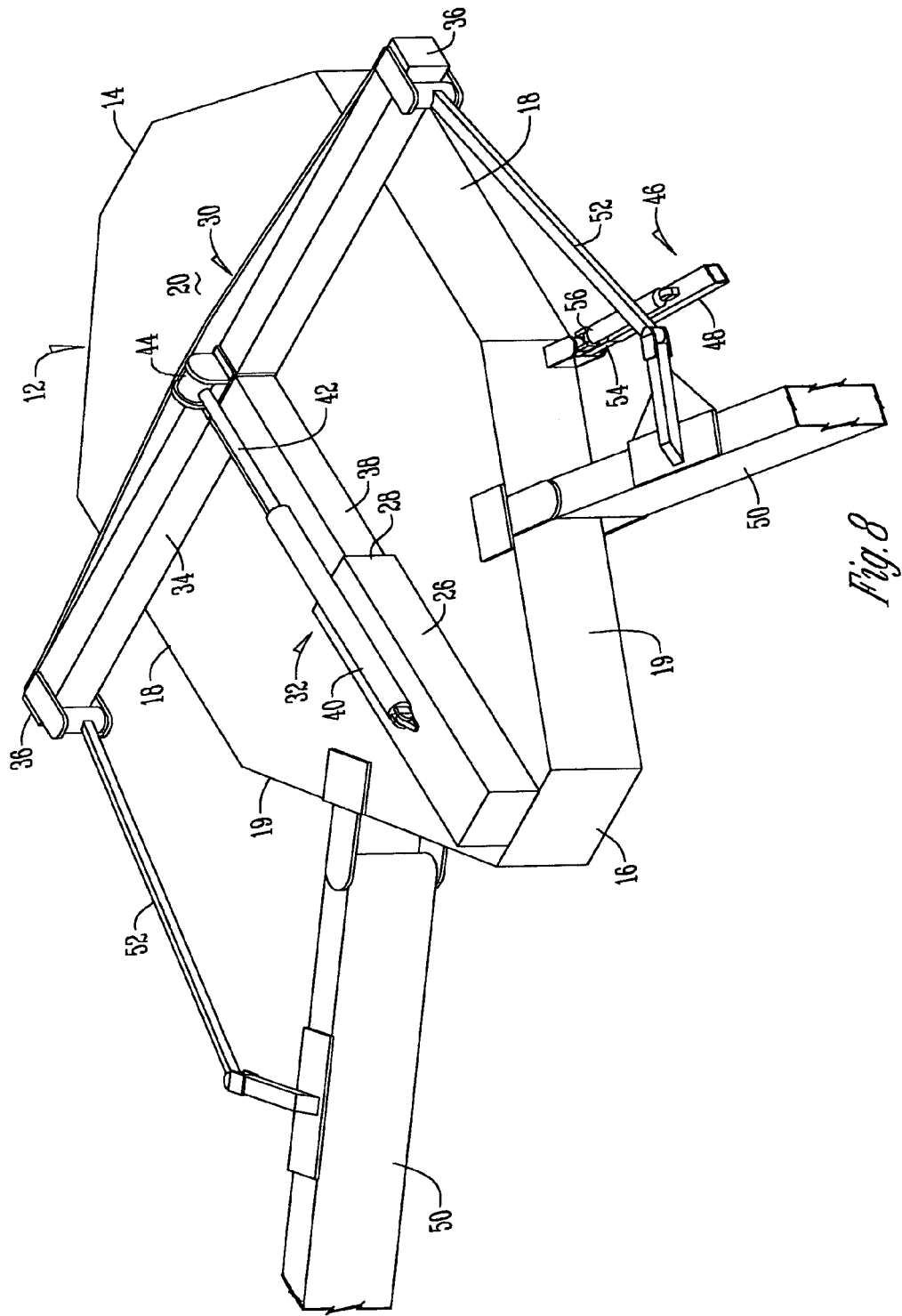
FIG. 8 is a side perspective view of FIG. 6.

A hydraulic cylinder 40 (FIGS. 7 and 8) is rigidly secured to housing 26 and includes a conventional forwardly extending rod 42. The forward end of rod 42 (FIG. 7) is connected in any convenient way to the center of transverse beam 34 so that the cylinder when actuated can move the T-beam 30 from a rearward position (FIGS. 5 and 7) to a forward position (FIGS. 6 and 8).

Figure 1:
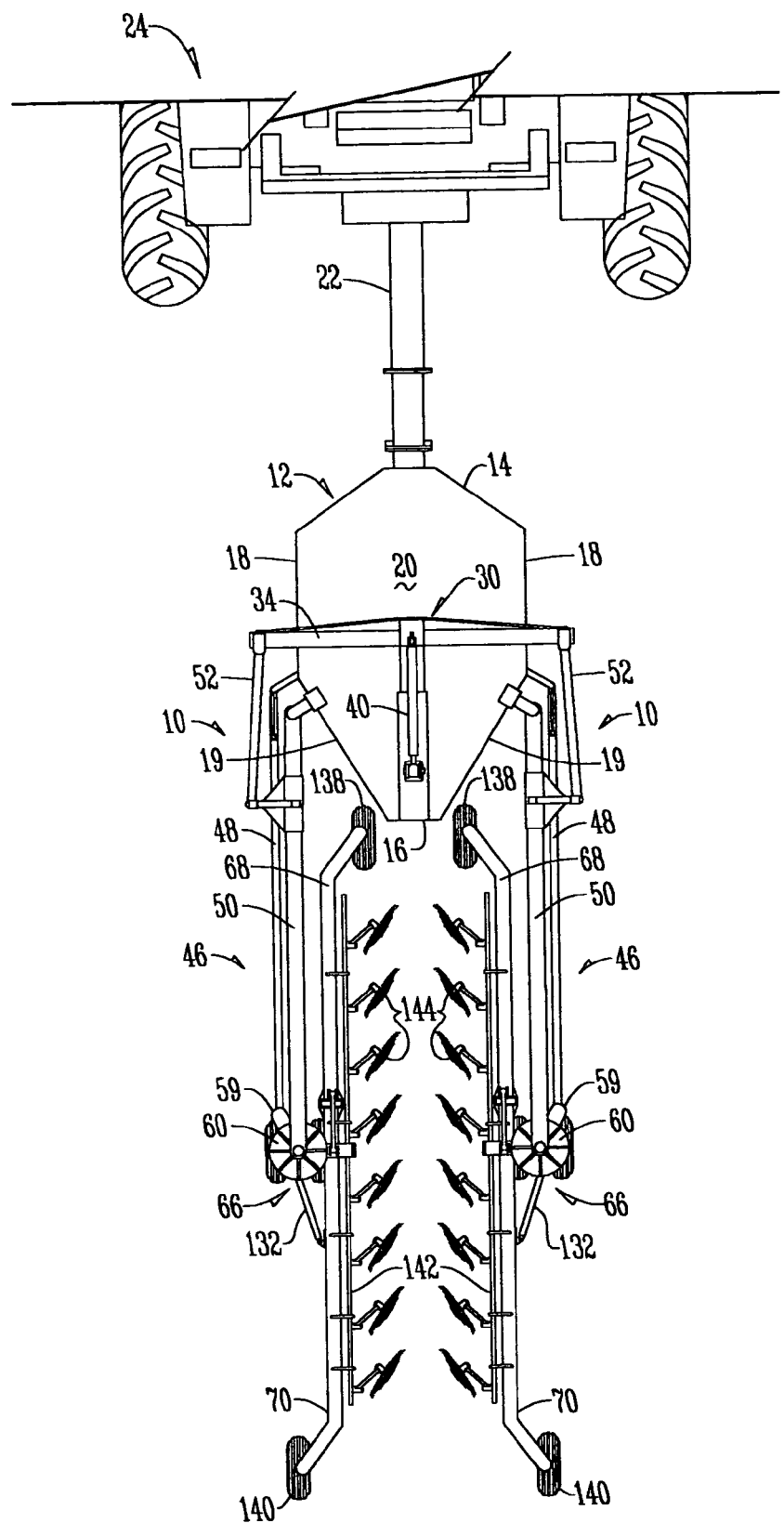
FIG. 1 is a plan view showing the hay rake of this invention in a travel mode.
Figure 2:
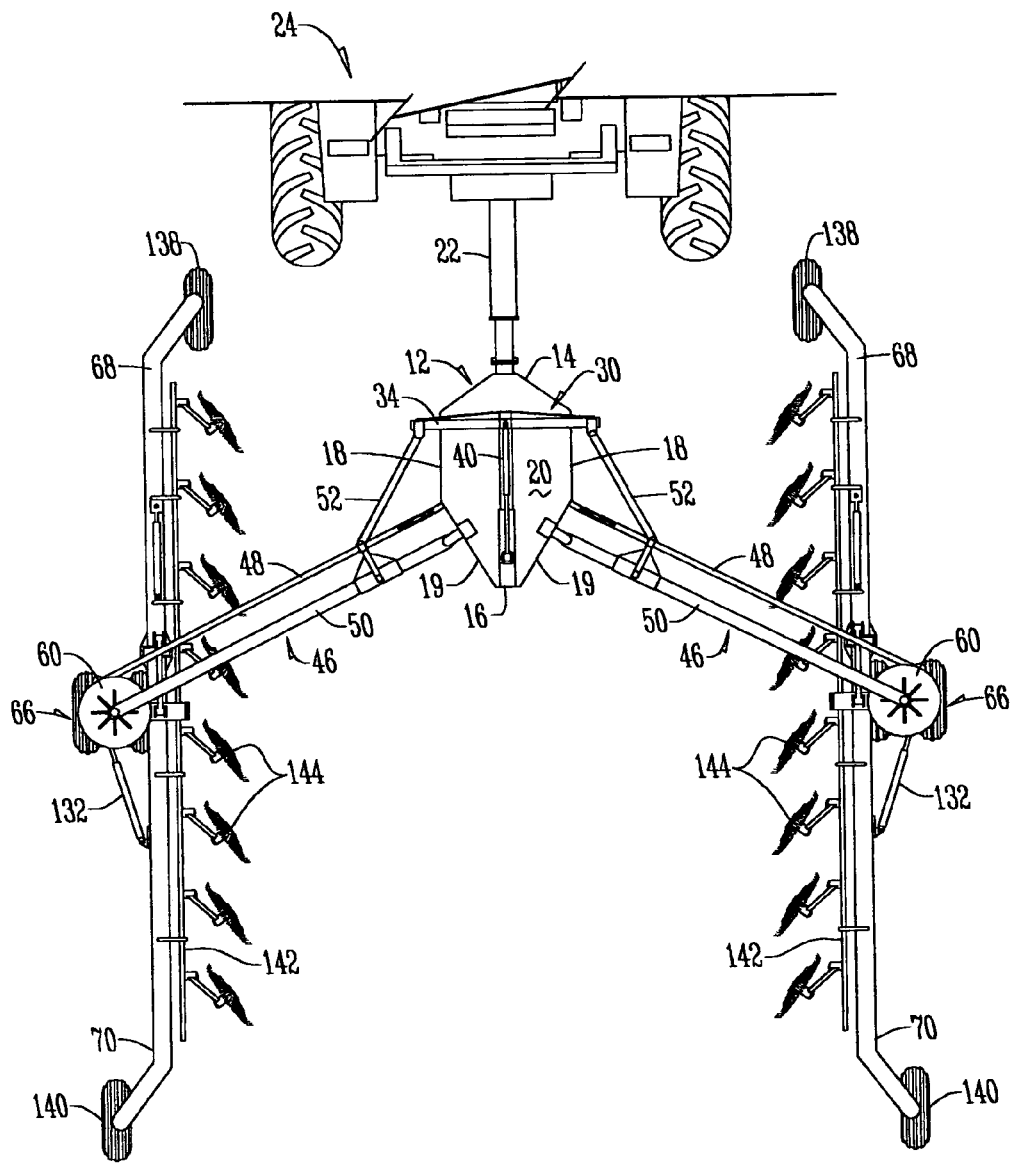
FIG. 2 is a plan view similar to that of FIG. 1 but shows the hay rake of this invention in a first mode of being moved into an operational condition.

As shown in FIGS. 1-8, parallelogram-configured wings 46 are comprised of leading beam 48 and trailing beam 50 which are pivotally secured by their inner ends in spaced parallel relationship to both diagonal sides 19 of base frame 12. Each wing 46 is adapted to nest in a travel position of FIG. 1, and to be pivoted outwardly from the base frame 12 at an angle of approximately 60° when in the raking position of FIG. 3. Tie members or struts 52 are pivotally connected to the end of beam 34, and are pivotally connected by their other ends to trailing beam 50. The wings move from the travel position in FIG. 1 to the raking position of FIG. 3 by moving T-beam 30 from a rearward position (FIG. 1) to a forward position (FIG. 2). The leading beam 48 is length adjustable as shown in FIG. 5 (see numeral 54, FIG. 8) an increment of approximately one inch by cylinder assembly 56 as will be discussed hereafter.

Figure 9:
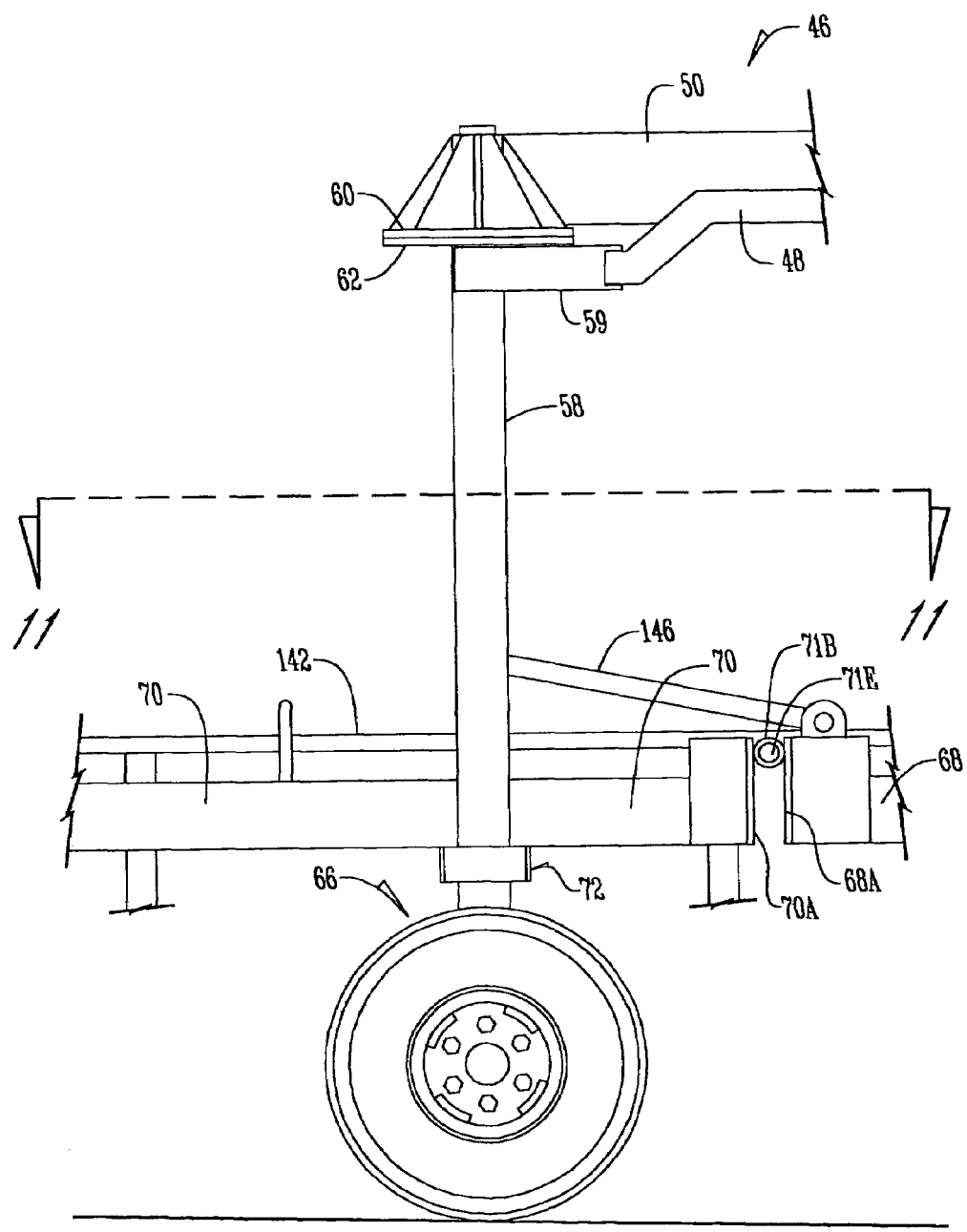
FIG. 9 is an elevational view of the post that extends upwardly from positioning wheels, and related components.
Figure 10:
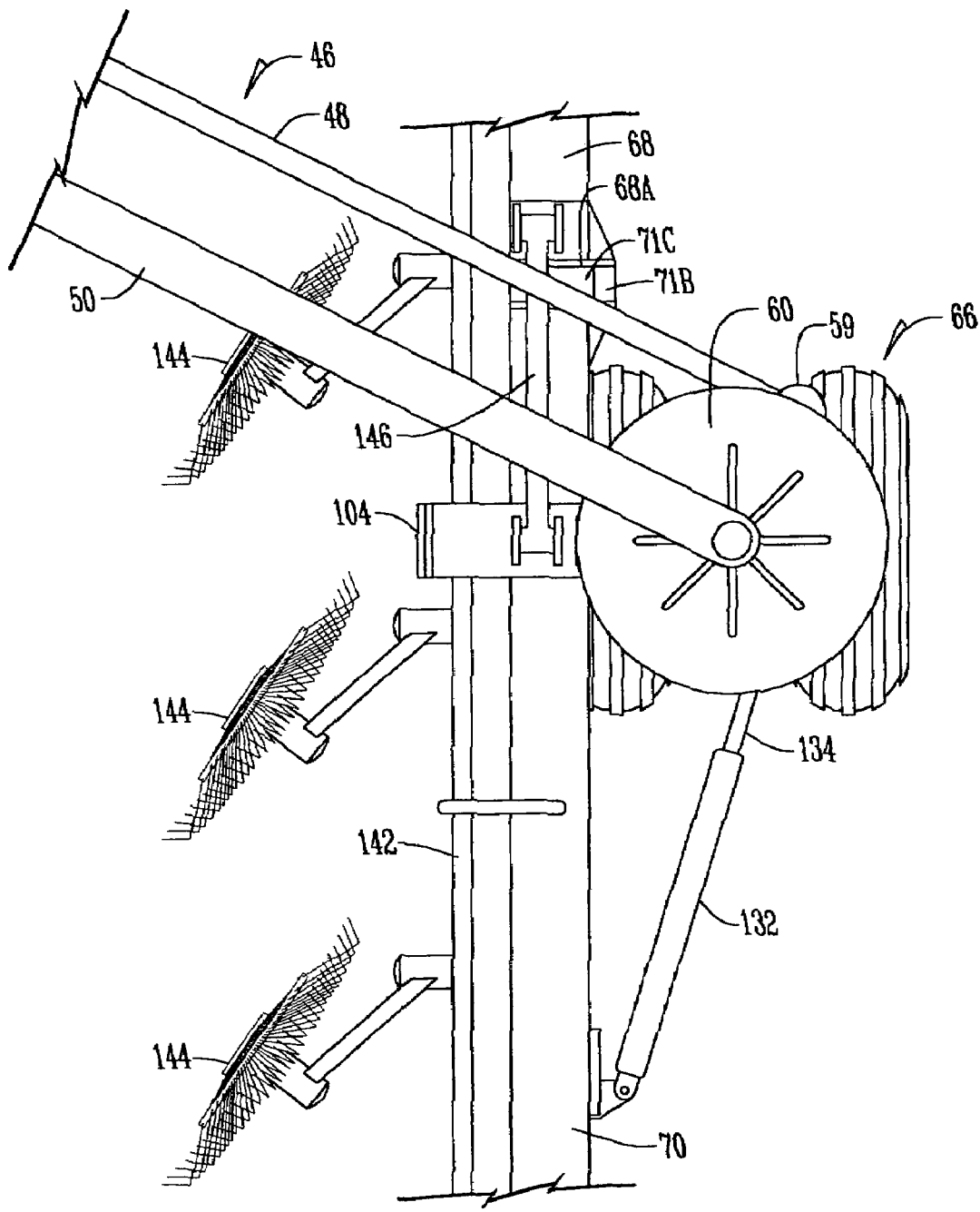
FIG. 10 is a plan view as seen from above of the apparatus of FIG. 9.

As shown in FIGS. 9 and 10, the outer end of trailing beam 50 is pivotally secured to the top end of steel post 58. Link 59 is pivotally connected by its ends to the outer end of forward beam 48 and post 58. Thus, the parallelogram-configuration of the wings 46 is defined by the pivotal connection of the inner ends of the leading and trailing beams to the base frame 12, and the outer ends thereof pivotally connected by link 59. The longitudinal axis of link 59 is parallel to side 19 of base frame 12 (FIG. 1).

As best shown in FIG. 9, a horizontal gusset plate 60 is rigidly secured to the outer end of trailing beam 50, and rotationally mates with a similar gusset plate 62 on the top of post 58. A suitable vertical pivot shaft (not shown) extends upwardly from the top of post 58 through the gusset plates 60 and 62 which serve to strengthen the pivoted connection between the end of trailing beam 50 and post 58.

The lower end of post 58 is secured to axle 64 which rotatably supports positioning wheels 66. This arrangement serves to equally balance the downward load on post 58 on the wheels 66.

Forward and rearward rake arms 68 and 70, respectively are pivotally joined together by hinge assembly 71 (FIG. 16B) adjacent their inner ends 68A and 70A and are always in elongated alignment. An inner end plate 71A is secured to the inner end 68A of rake arm 68 to which spaced hinge sleeves 71B are secured. Sleeves 71B on plate 68A mates with tube 71C which is welded to inner end plate 70A. Hinge pin 71E extends through sleeves 71B and tube 71C to pivotally secure the rake arms together.

Figure 13:
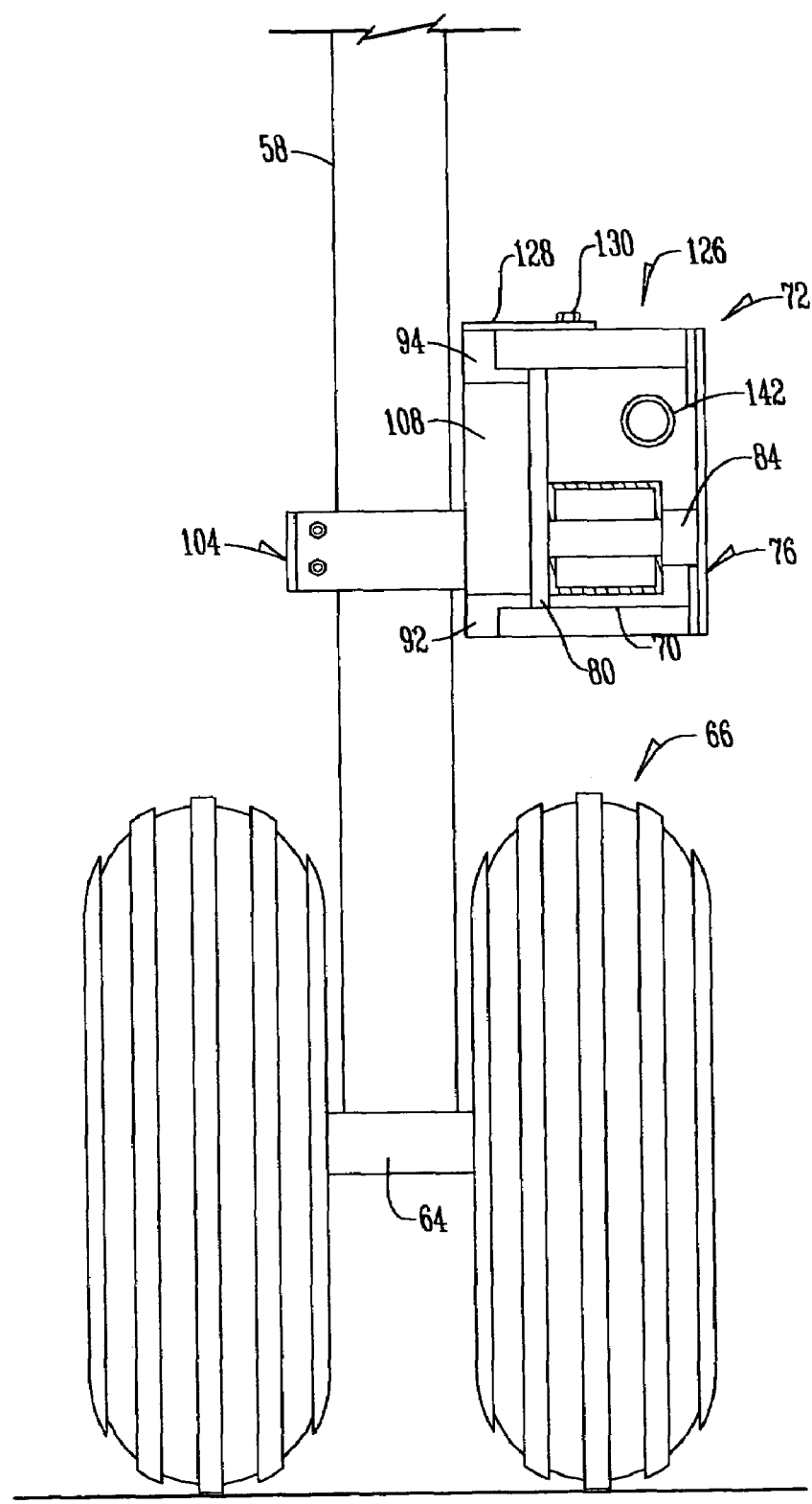
FIG. 13 is an elevational view of the positioning wheels and the pivotal assembly attached to the upstanding post as seen from a forward direction.
Figure 14:
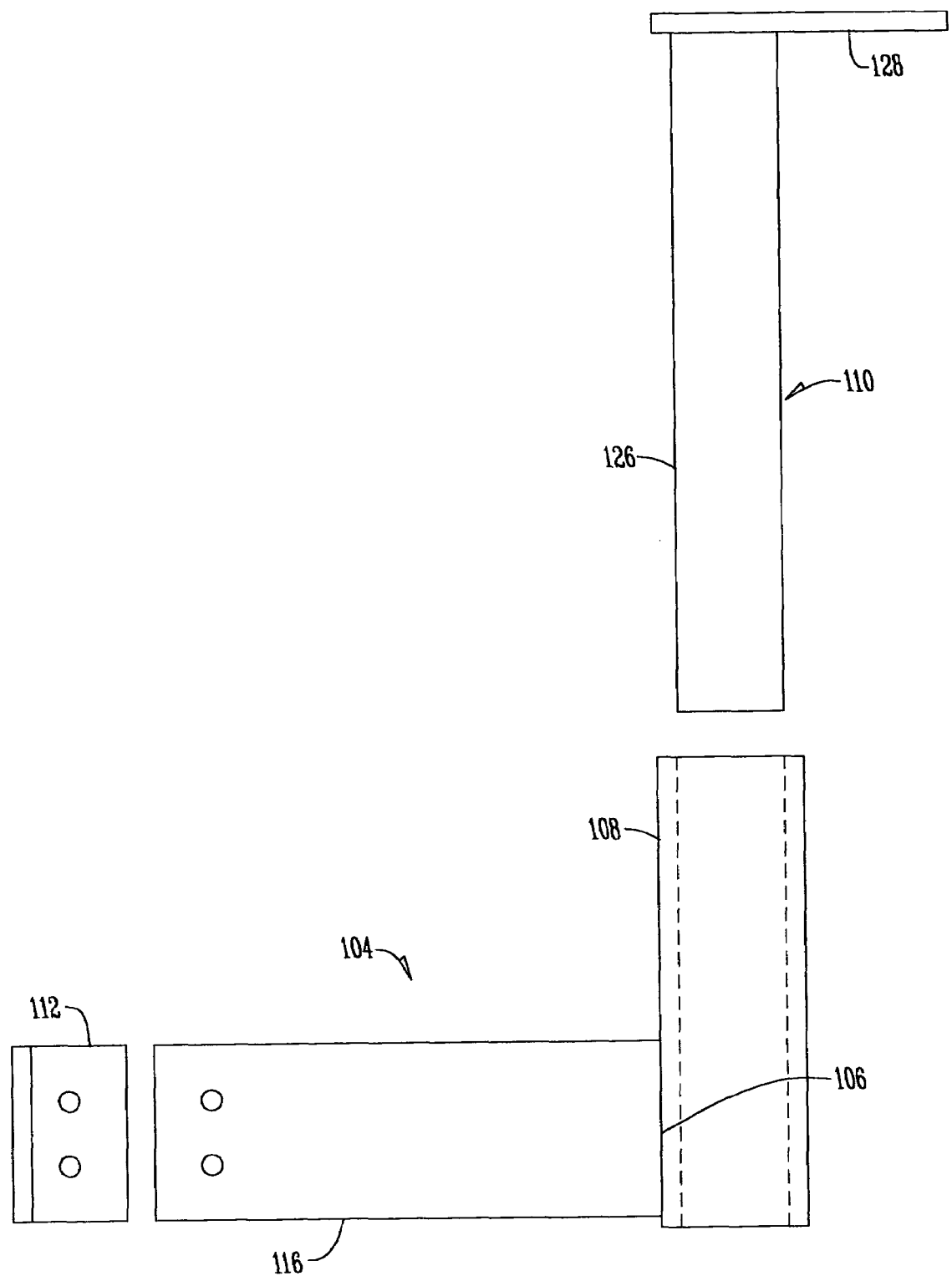
FIG. 14 is an elevational view of component parts of the pivotal assembly.
Figure 15:
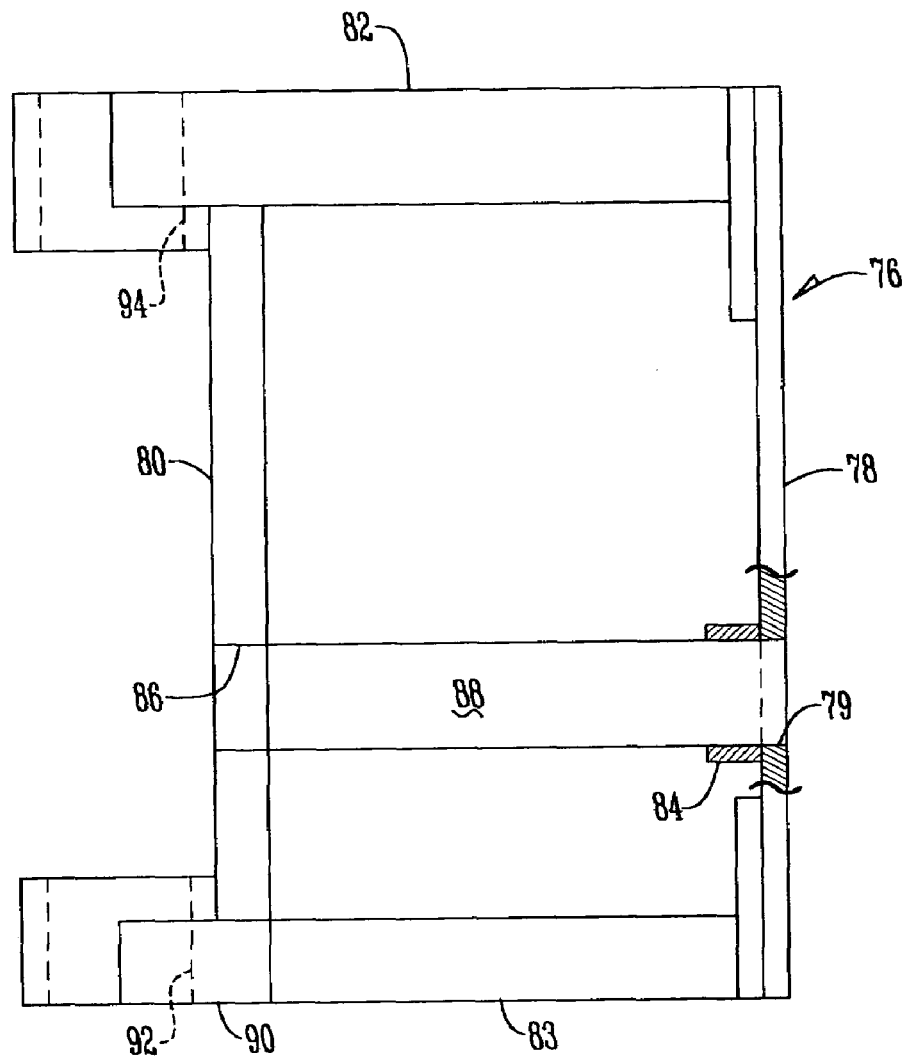
FIG. 15 is an elevational view of other component parts of the pivotal assembly.
Figure 16:
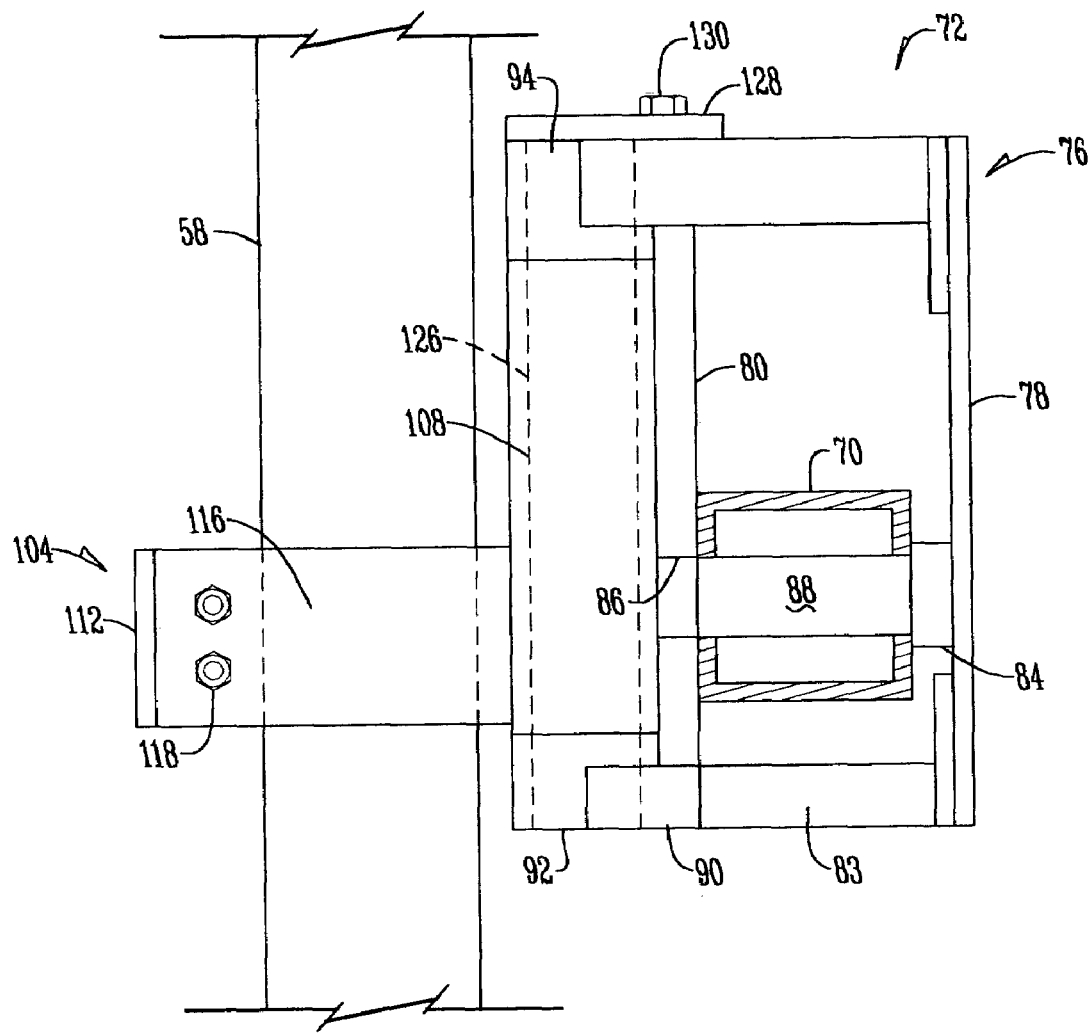
FIG. 16 is a forwardly looking elevational perspective view of the assembled pivotal assembly.

As will be discussed hereafter, the pivot assembly 72 is pivotally attached to post 58 just above the level of positioning wheels 66. (FIG. 13). Pivot assembly 72 (FIGS. 15 and 16A) includes a subframe 76 which is vertically disposed and has vertical sides 78 and 80, a top member 82, and a bottom member 83. A stub bearing sleeve 84 with a horizontal center axis is welded to the lower inside surface of side 78 and is centered on an aperture 79 in side 78 in alignment with aperture 86 to receive pin 88. Pin 88 is used to pivotally connect the inner end of rake arm 70 to assembly 72 by extending through a corresponding horizontal aperture (not shown) in the end of rake arm 70 when the aperture in the end of the arm 70 registers with aperture 79, sleeve 84 and the aperture 86 in the lower end of side 80. This assembled condition is shown in FIGS. 15 and 16.

Figure 11:
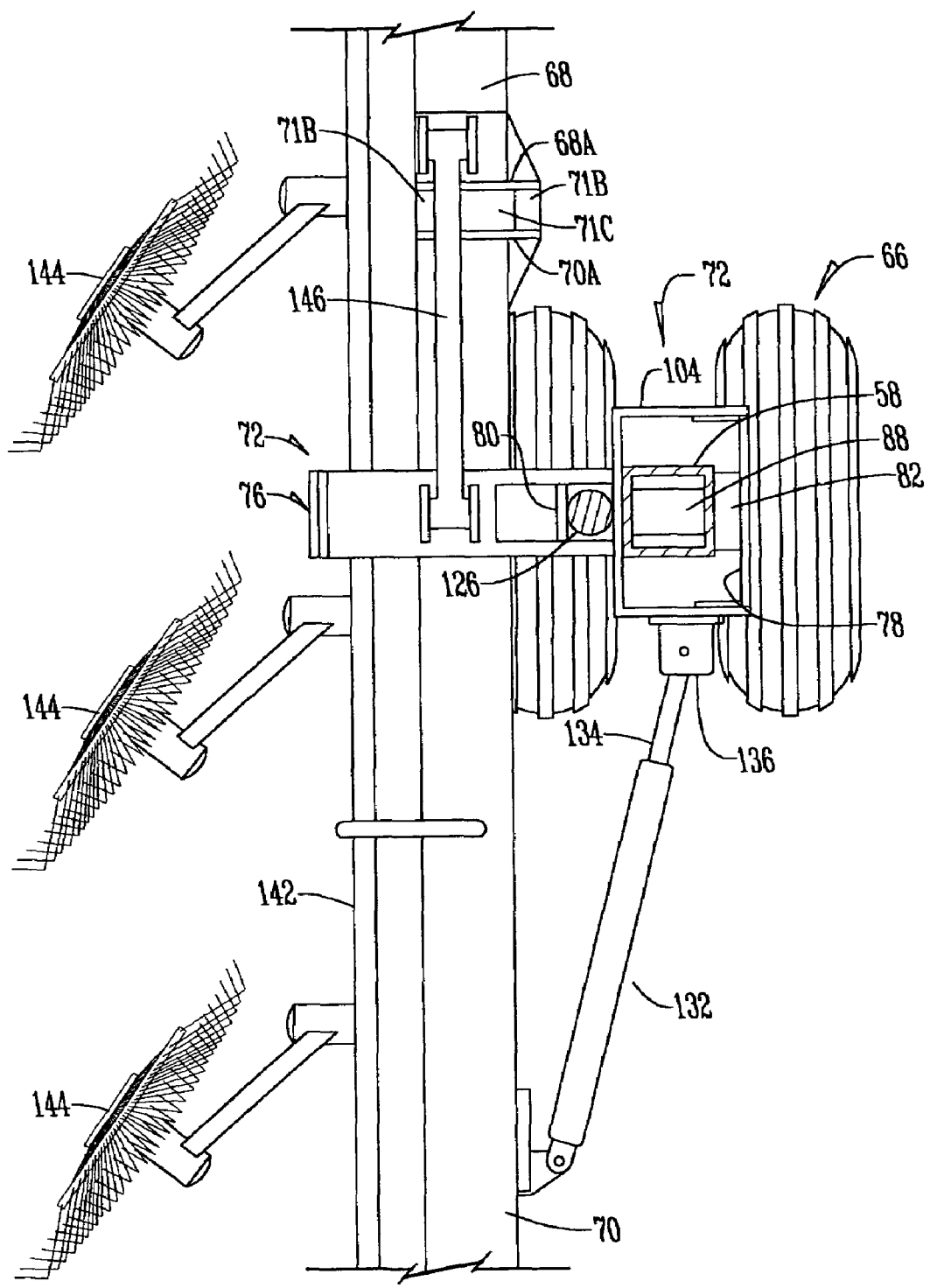
FIG. 11 is a sectional view of the pivotal assembly between the upstanding posts, the positioning wheels, and the separate hay rake arms, taken on line 11-11 of FIG. 9.
Figure 16A:
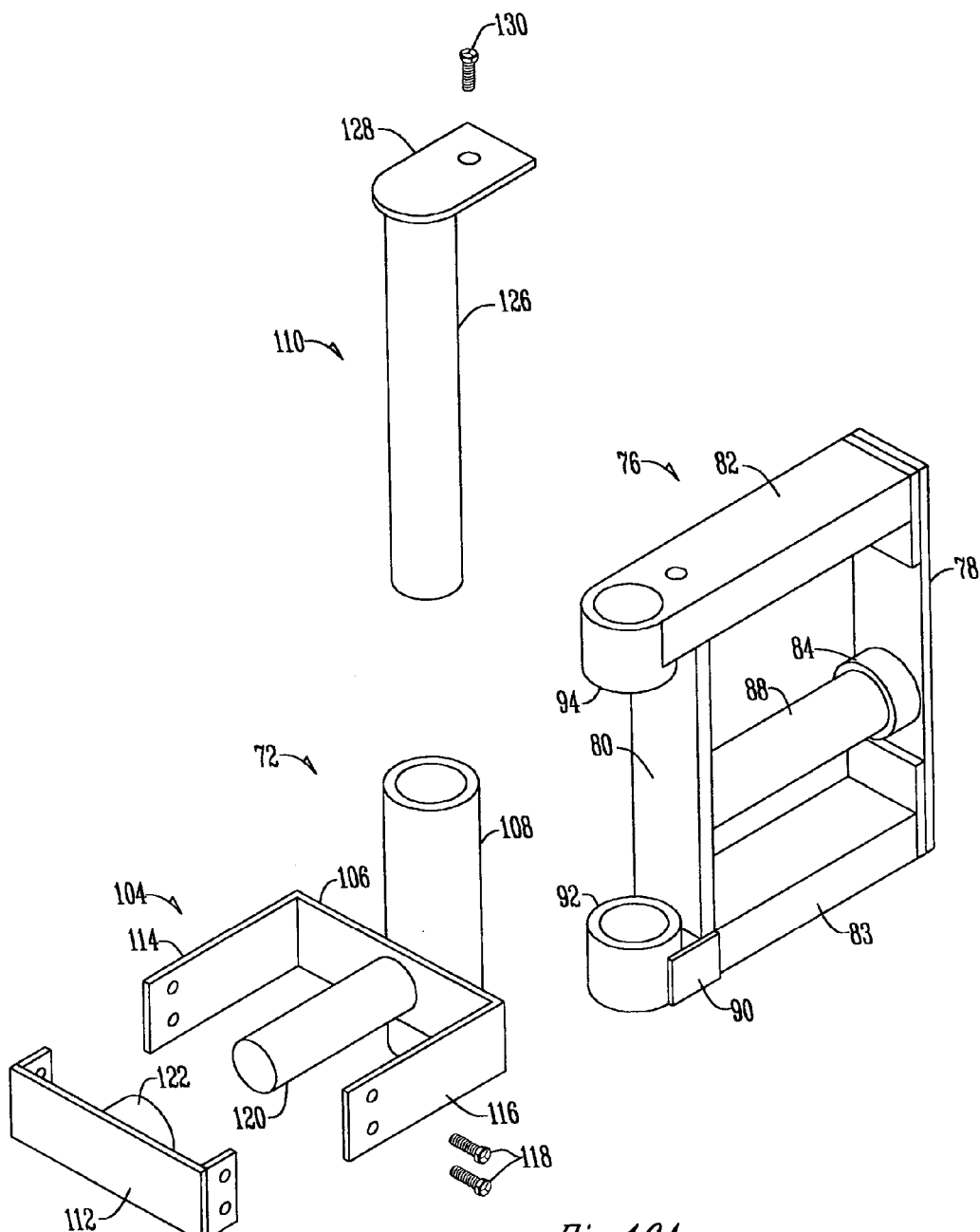
FIG. 16A is an exploded perspective view of the pivotal assembly.
Figure 16B:
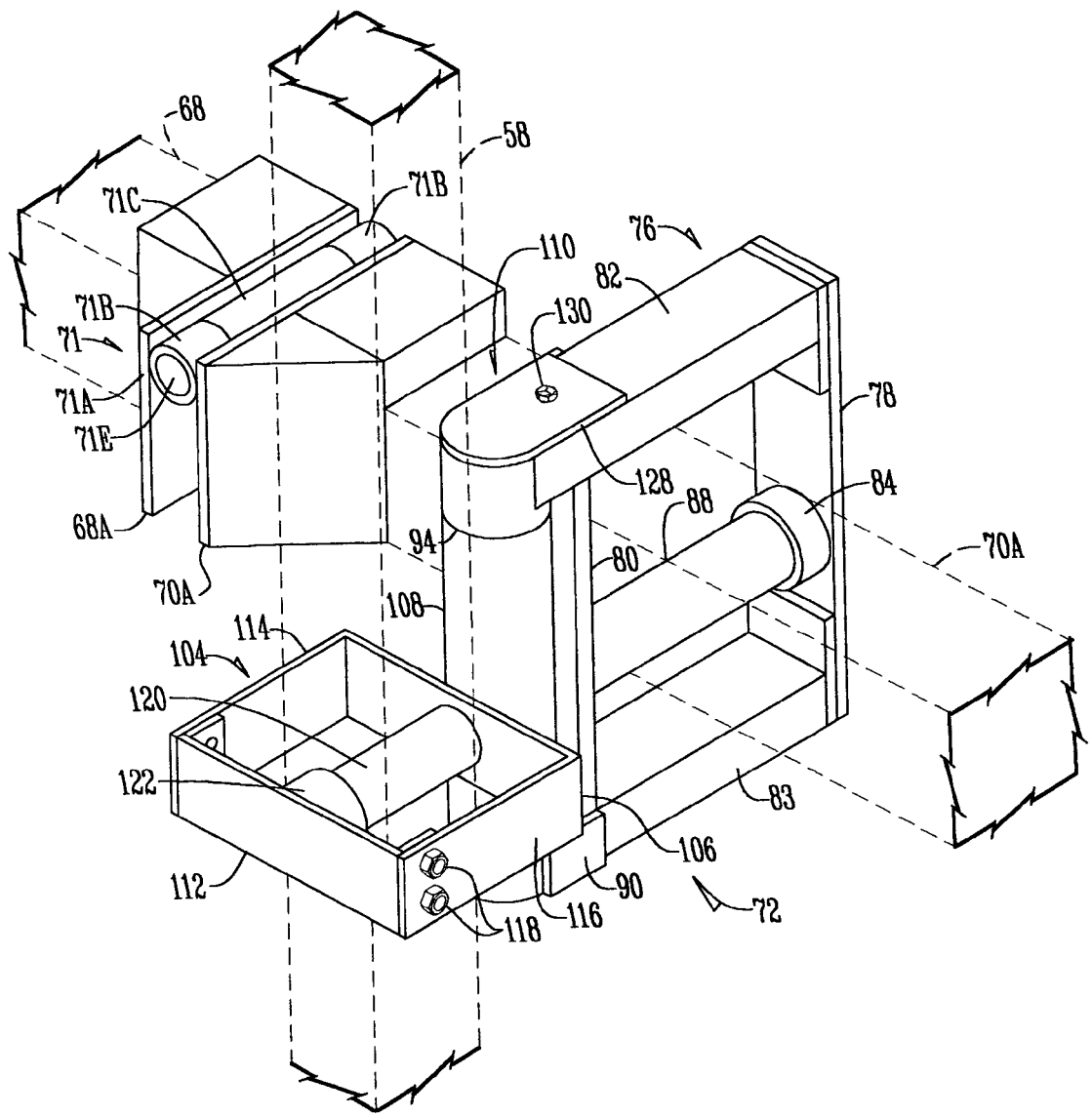
FIG. 16B is a perspective view of the assembled pivoted assembly.

A horizontal bracket 90 is welded to the bottom of side 80 and has a hollow vertical sleeve bearing 92 (FIGS. 15 and 16A) welded thereto adjacent an outer end of the bracket. The sleeve bearing 92 is in vertical alignment with a similar sleeve bearing 94 that is welded to an extension of top member 82 (FIG. 15). Pivot assembly 72 has an additional subframe 104 which extends around post 58 and which is pivotally secured to subframe 76 about a horizontal axis (FIGS. 16 and 16B). Subframe 104 is rectangular in shape and normally dwells in a horizontal plane. It has an inner side 106 to which a vertical sleeve 108 and detachable pin 110 (FIG. 16A) are a part; an outer side 112, a rear side 114, and a front side 116 (FIGS. 16A and 16B). The side 112 is detachably secured to the rearward and forward sides 114 and 116, respectively by bolts 118 (FIG. 11). A horizontal stub shaft 120 is welded to an inner surface of side 106 (FIG. 16A) to be pivotally and slidably received in hollow horizontal bearing sleeve 122 welded to and extending through post 58. As shown in FIGS.

11 and 16B, pin 88 pivotally extends through apertures (not shown) in rake arm 70. This assembly, shown in FIG. 16B, pivotally secures the subframe 104 to post 58 for limited rotation of the post with respect to the subframe 76. Ample clearance is provided between forward side 114 and rearward side 116 for this pivotal movement. The engagement of stub shaft 120 with bearing sleeve 122 maintains the position of post 58 against the inner surface of side 106. Removal of bolts 118 will permit side 112 to be removed from the subframe to service or lubricate the shaft 120 or the bearing sleeve 122 as may be required.

The vertical bearing sleeve 108 welded to the outer surface of side 106 (FIG. 16B) is of a size to fit between the vertically disposed opposite bearing sleeves 92 and 94 on subframe 76 shown in FIG. 16A. A pin 126 with pin latch bar 128 is held in place by bolt 130 to detachably pivot subframe 104 to subframe 76 (FIG. 16A). Thus, pivot assembly 72 is comprised of subframes 76 and 104 which are secured together about pin 126 for limited swinging about the vertical axis of pin 126 (FIG. 16A).

Figure 3:
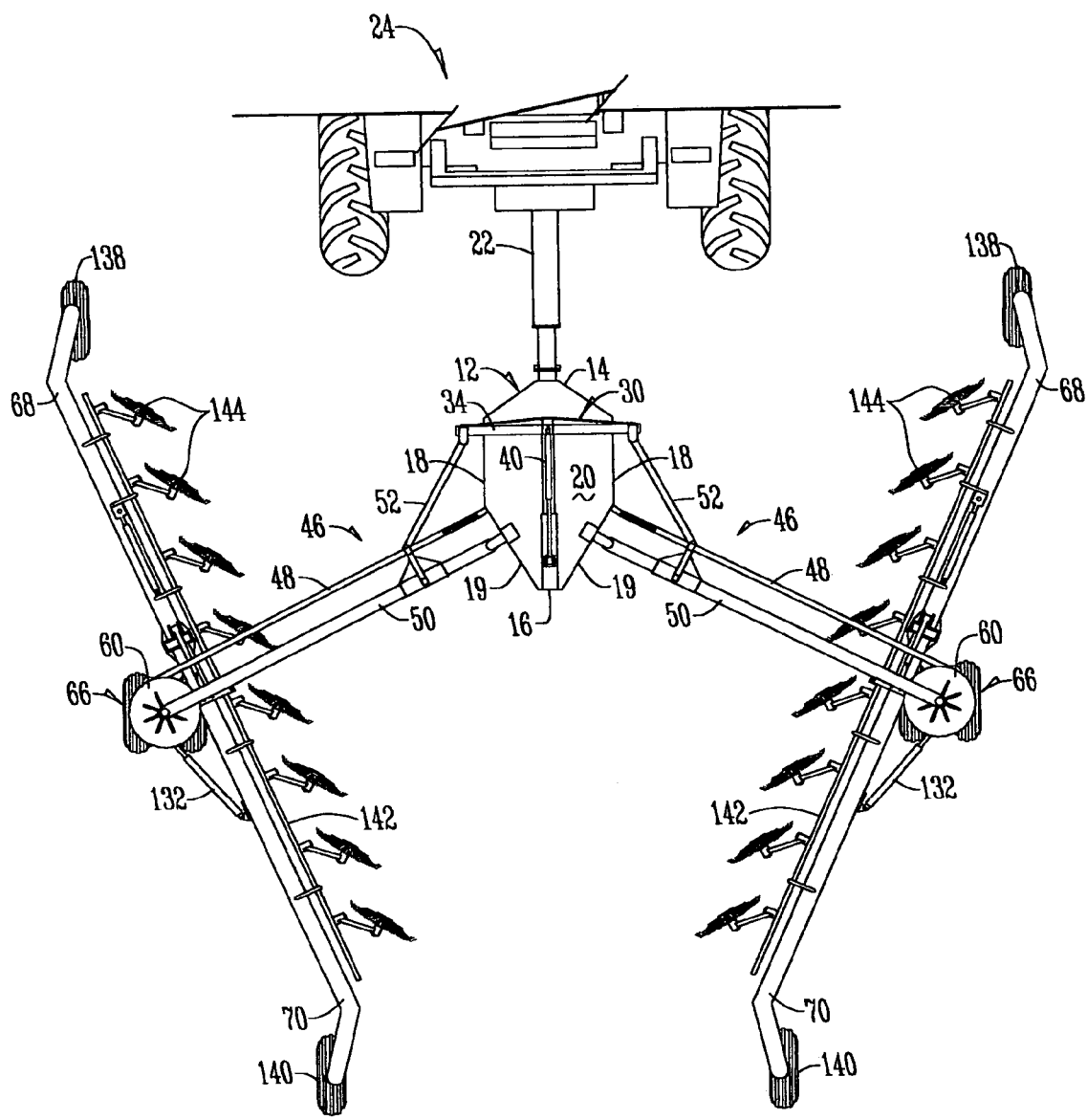
FIG. 3 is a plan view similar to FIGS. 1 and 2 but shows the hay rake of this invention in a complete operational position.
Figure 4:
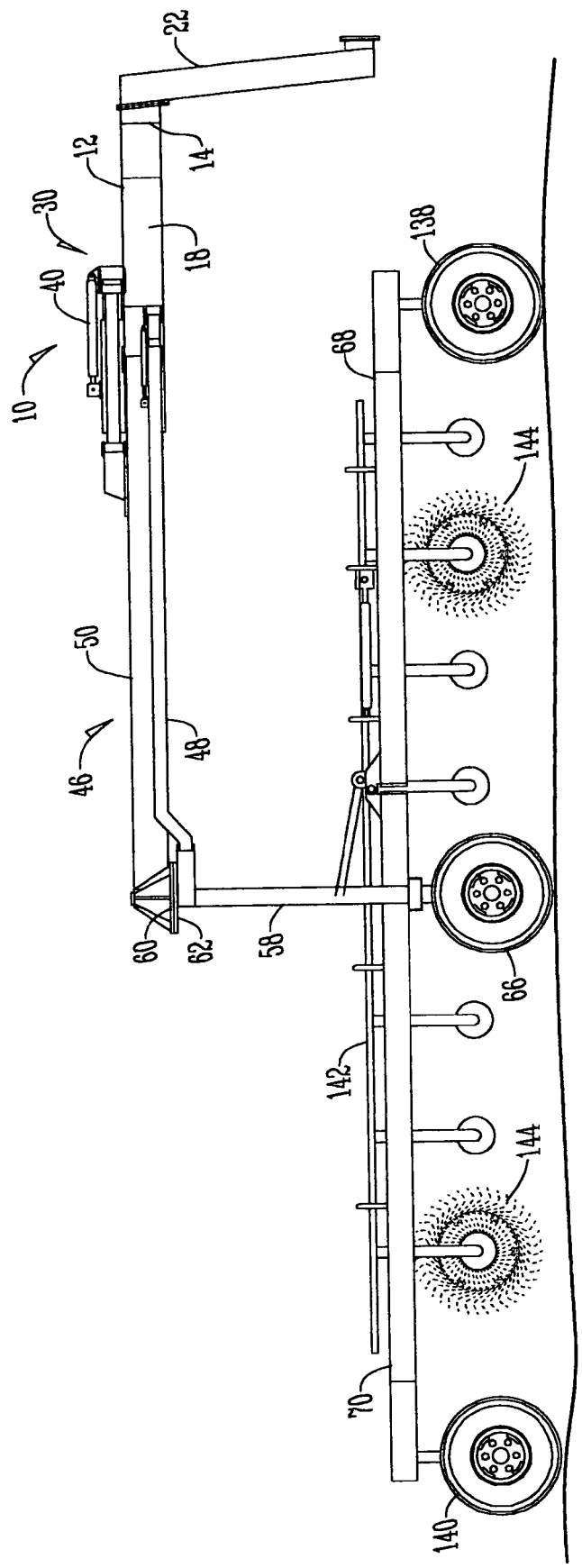
FIG. 4 is a side elevational view of FIG. 2.
Figure 12:
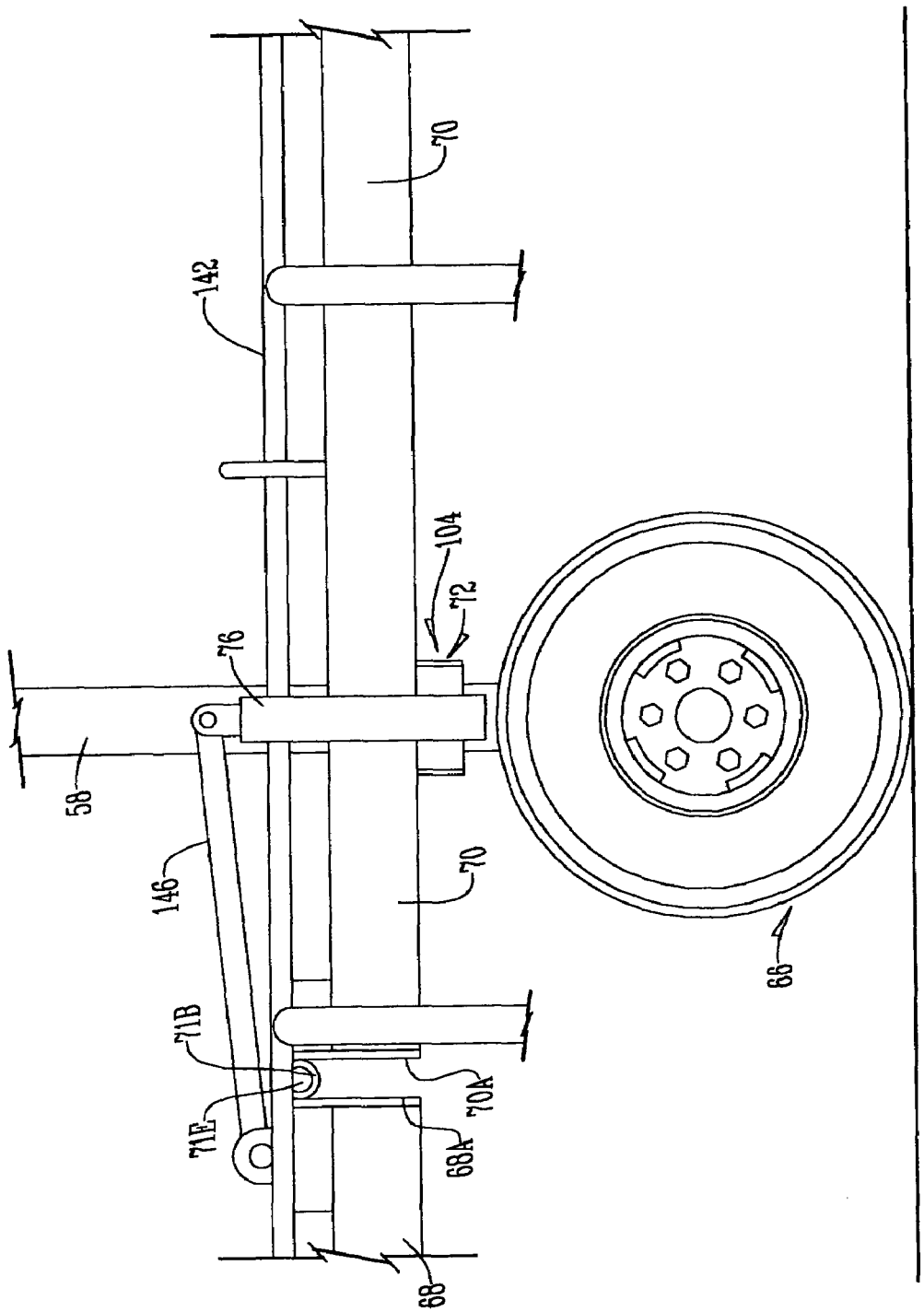
FIG. 12 is an elevational view taken from the opposite direction of the subject matter of FIG. 11.

The rake arms 68 and 70 can rotate about the vertical axes of pin 126 of subframe 104 so that the angular orientation thereof as shown in FIGS. 1-3 can take place. For stabilization purposes, a stabilizer bar 146 (FIG. 12) extends between subframe 76 and rake arm 68 which serves to maintain subframe 76 in a vertical position at all times when hay arms 68 and 70 pivot in a vertical plane with respect to each other. The bar 146 is pivotally secured by its ends (FIG. 12) to subframe 104 and rake arm 68.

Thus, the attitude of the positioning wheels 66 is maintained at all times by the parallelogram-configured wing structures 46 via the post 58. However, the separate rake arms 68 and 70 can be pivoted through hinge assembly 71 (FIG. 16B) both upwardly and downwardly as terrain features require. The arms 68 and 70 can be rotated horizontally on pin 126 between the positions shown in FIG. 1 and FIGS. 2 and 3 between travel and operational positions without stressing in any destructive way the pivotal assembly 72.

With reference to FIG. 11, a hydraulic cylinder 132 with piston rod 134 extends between frame 104 and rake arm 70 with universal connections at the ends of the piston rods and cylinders. The cylinders 132 cause the horizontal combined rotation of the arms 68 and 70.

Castor wheels 138 are mounted on the forward ends of leading rake arms 68. Similarly, castor wheels 140 are mounted on the rearward ends of trailing rake arms 70.

Figure 19:
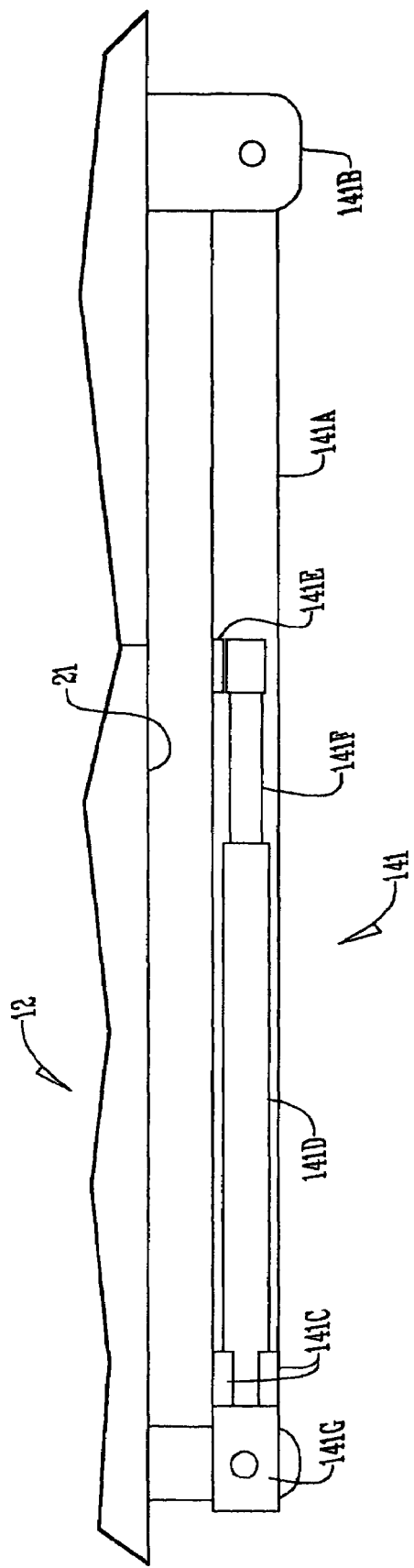
FIG. 19 is a side elevational view of the stabilizer frame of FIG. 17 when in an inoperative stored position underneath the base frame.

With reference to FIGS. 17-19, a V-shaped stabilizer frame 141 with side diagonal side members is pivotally secured by the upper ends of members 141A to the bottom plate 21 of base frame 12 by members 141B so as to be located in a horizontal position, (by suitable fasteners, not shown) during the field operations, and to be located in a vertical plane when in a travel mode (FIG. 18). A horizontal bar 141C is welded to the lower ends of member 141A opposite to members 141B. Length adjustable stabilizer bars 141D are pivotally secured to the ends of bar 141C and can be detachably folded and retained by pin or chain number 141E in an inoperative position as shown in FIG. 17. However, the bars 141D can be moved to the position of FIG. 18 when in the travel mode, and the free ends thereof can be coupled to the front ends of leading rake arms 68 by extension members 141F to provide some lateral stiffness between the lateral position of the castor wheels 138 as the device is being towed in the travel mode of FIG. 1. When not in use, the frame 141 is detached from the hay arms 68, and folded back to the position shown in FIGS. 17 and 19. The frame is detachably held in the position of FIGS. 17 and 19 by clevis 141G.

Conventional lift tubes 142 (FIG. 4) are operationally connected to hay rake wheels 144 and are adapted through conventional means (not shown) to raise the wheels 144 off of the ground for traveling, and to engage the ground during raking.

It should be understood that the farm tractor 24 is equipped with one or more hydraulic circuits to separately control the hydraulic cylinders 40, 56 and 132. This circuitry has not been shown in the drawings but is well within the expertise of one skilled in the art. The cylinders 56 are hydraulically coupled together in conventional fashion in a slave mode, so that they operate in unison. This can also be true of the cylinders 132 although it is sometimes desirable to have an override mechanism so that they can be independently operated if desired.

In operation, the rake 10 is towed to the hay field in which it is to function by farm tractor 24 through a conventional coupling between the tongue 22 and the drawbar of the tractor. The hydraulic lines of the cylinders on the rake are operationally connected to the hydraulic circuit or circuits of the tractor, all of which are controlled from the tractor by the operator. FIG. 1 is a plan view of the hay rake of this invention in its transport position.

Upon entering the field where the raking is to take place, the lift tubes 142 are moved to lower the rake wheels 144. The hay in the field will have been previously cut and cut or placed in a plurality of windrows which are substantially parallel. The purpose of the rake of this invention is to gather together or combine the cut hay from a plurality of windrows into a single windrow for baling whereupon the original windrows are tumbled or turned to facilitate their further drying before the baling is later conducted. Thus, the operator of the tractor aligns the hay rake 10 in the condition shown in FIG. 1 in a direction where the operator expects to make a first pass through the hay field.

The first step in readying the hay rake for operation is to actuate the cylinders 56 to shorten the leading beam 48 of the wing structures 46 slightly (e.g., 1 inch or so) which turns the positioning wheels 66 slightly inwardly. The tractor is then placed in reverse and while backing, the hydraulic cylinder 40 on the base frame 12 is actuated to extend cylinder rod 42 and to move the T-beam 30 forwardly from the positions of FIGS. 5 and 7 to the forward positions of FIGS. 6 and 8. This causes the hay rake to then assume the position shown in FIG. 2 of the drawings. The slight "toeing in" of the positioning wheels 66 causes the hay arms to easily move to this position as the rake moves rearwardly. The cylinder assemblies 56 are then reversed so as to bring the positioning wheels 66 back into a forwardly orientation.

The cylinders 132 are then actuated to cause the rake arms 68 and 70 to pivot from the position shown in FIG. 2 to the position in FIG. 3. The cylinders 132 cause the rearward rake arm 70 to pivot inwardly towards each other. Since the forward rake arms 68 are linked to the rearward rake arm 70 through hinge assembly 71 as described heretofore, the forward rake arm 68 will move outwardly from each other as the rearward rake arms are moving towards each other. The precise angular position can be determined by the operator through the control over cylinders 132.

The lift tubes 142 are thereupon conventionally moved from an elevated position to a lower ground engaging position whereupon the hay rake 10 is ready for operation. All the while, positioning wheels 66 are oriented in a forwardly direction by reason of the parallelogram-configured wing structures 46. The great weight of the various components of the device are centered on the post 58. The subframe 76 is maintained in a precise vertical position by stabilizer bar 146.

This vertical orientation serves to substantially reduce the torsion imposed upon the pivot assembly 72 and the posts.

The castor wheels 138 and 140 serve as gauge wheels to maintain the hay rake arms 68 and 70 at the correct height. They also support the ends of the arms during transport as the arms may pivot on pivot assembly 71. The castor wheels work independently of each other to accommodate variations in terrain.

When the tractor hitch or tongue 22 goes upwardly or downwardly, the post 58 will tilt forwardly or rearwardly, respectively, on pin 120 (FIGS. 16A, 16B).

The hay rake of this invention increases the visibly of the operation by the tractor operator. It makes turning easier and quicker. The versatile pivotal abilities of the pivot assembly 72 allow each of the rake arms 68 and 70 to move over terrain features of different elevation. The manner of construction of the hay rake 10 facilitates such repairs as may be required.

To return the hay rake from its operating position of FIG. 3 to its travel position of FIG. 1, the cylinders 132 are reversed to move the rake arm 68 and 70 back to the positions of FIG. 2. The movement of cylinder assemblies 56 as described above is reversed as the hay rake is moved forwardly. The cylinder 40 is then reversed so as to cause the T-beam 30 to move from its forward position to its rearward position (FIG. 6 back to the position of FIG. 5) to cause the travel alignment of FIG. 1 to be assumed. The V-shaped stabilizer frame 141 is moved into its operating position as shown in FIG. 18, and the hay rake is thereupon in its travel mode for removal to another field of hay as soon as the lift tubes 142 are actuated to raise the hay raking wheels 144 upwardly from the ground surface.

Figure 20:
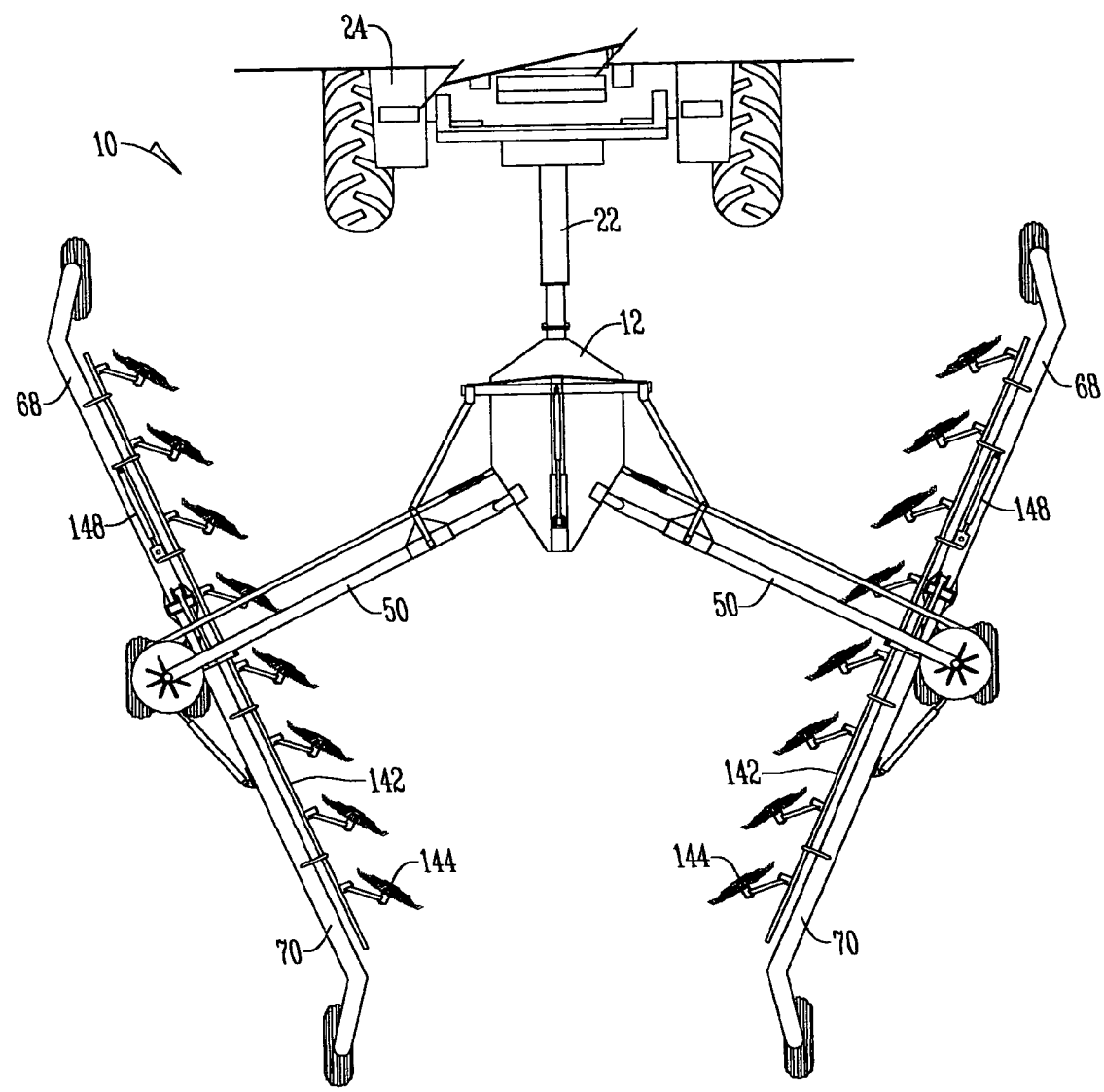
FIG. 20 is view similar to FIG. 3 but shows an alternative embodiment of the present invention in an operational position.

With reference to FIGS. 1 and 20, an alternative embodiment of the present invention is shown where foldable hay rake 10 is shown with a base frame 12, trailing arms 50, forward rake arm portions 68, rearward rake arm portions 70, lift tubes 142, raking wheels 144, and cylinders 148. It is the configuration and operation of cylinder 148 that is the focus of this embodiment, as will be discussed hereinafter. Hay rake 10 further comprises a tongue 22 that extends forwardly to be connected to the drawbar of a conventional farm tractor 24.

Figure 21:
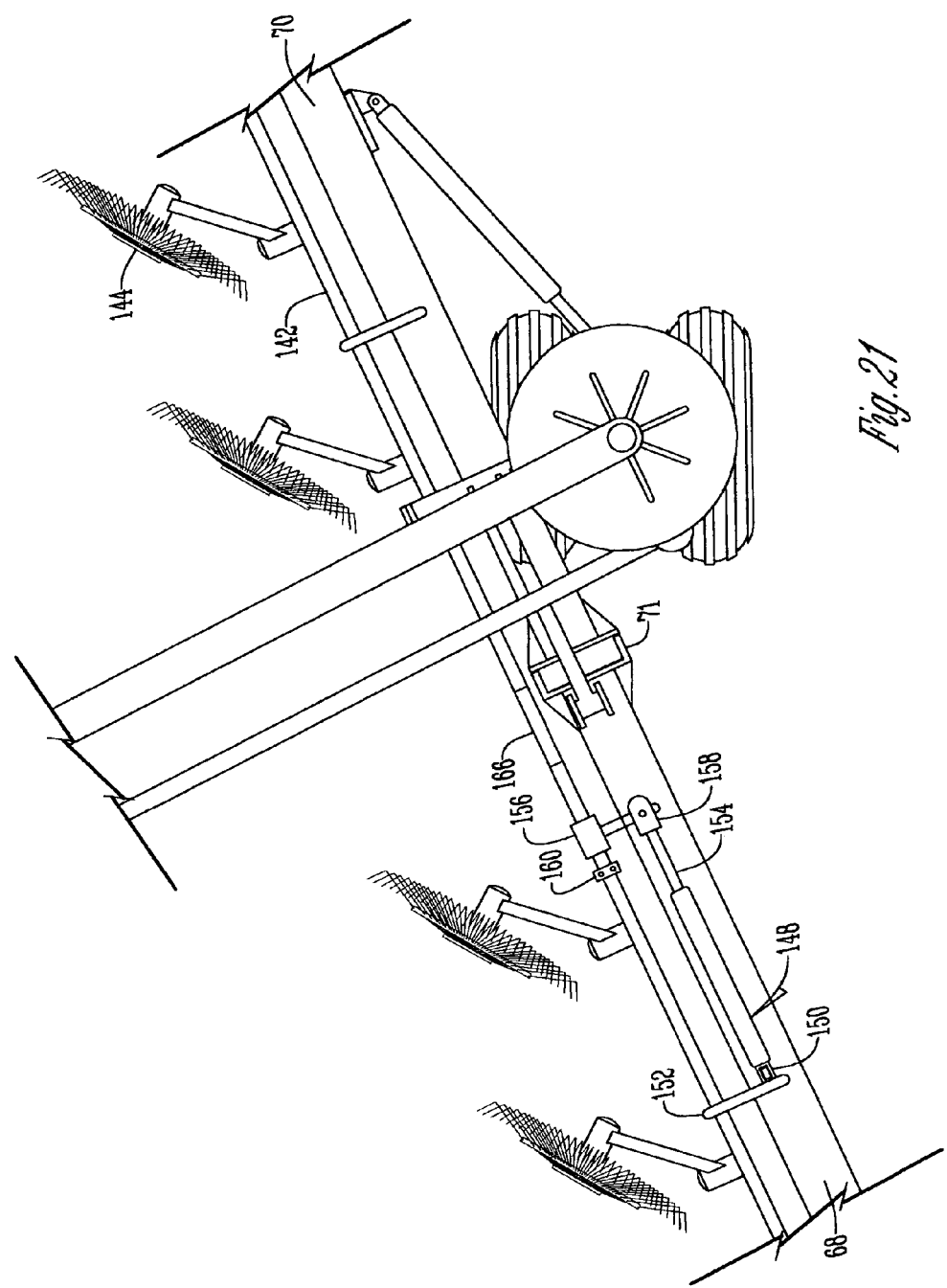
FIG. 21 is a plan view of the lift cylinder of this present invention.

With reference to FIG. 21, the lift tube 142 is slidably mounted to forward rake arm portion 68 such that the lift tube 142 can translationally shift forwardly or rearwardly with respect to the rake arm 68. Raking wheels 144 are hingedly attached to the lift tube 142 such that shifting the lift tube 142 forwardly with respect to the rake arm 68 raises the raking wheels 144 and shifting the lift tube 142 rearwardly lowers the raking wheels 144. Cylinder 148 is used to shift the lift tube 142 forwardly or rearwardly.

Hydraulic cylinder 148 includes a fixed end 150 that is pinned to bracket 152. Bracket 152 is rigidly mounted to rake arm 68 yet does not restrain the translational movement of lift tube 142. Cylinder 148 also includes a cylinder rod 154. Cylinder rod 154 attaches to sleeve 156 via pin 158. Sleeve 156 slides about lift tube 142 and is limited in the forward direction by a collar 160. Collar 160 is rigidly attached to the lift tube 142 by two bolts. As shown in FIG. 21, retracting cylinder rod 154 causes the cylinder 148 to pull the lift tube 142 forwardly. Similarly, extending the cylinder rod 154 allows the lift tube 142 to shift rearwardly. By pulling the lift tube 142 from the forward end, cylinder 148 will not bend the lift tube 142, which commonly occurs in conventional foldable hay rakes that push the lift tube from the rearward end. It should be noted that cylinder 148 may be positioned on the forward rake arm 68 as shown in FIG. 21. Alternatively, cylinder 148 may be flipped end-for-end from that shown in FIG. 21 without altering the performance of the cylinder 148. It is only important that the cylinder 148 be located on the forward rake arm 68 such that the cylinder 148 pulls the lift tube 142 from the forward end of the lift tube to raise the raking wheels 144 regardless of the longitudinal orientation of the cylinder.

Figure 22:
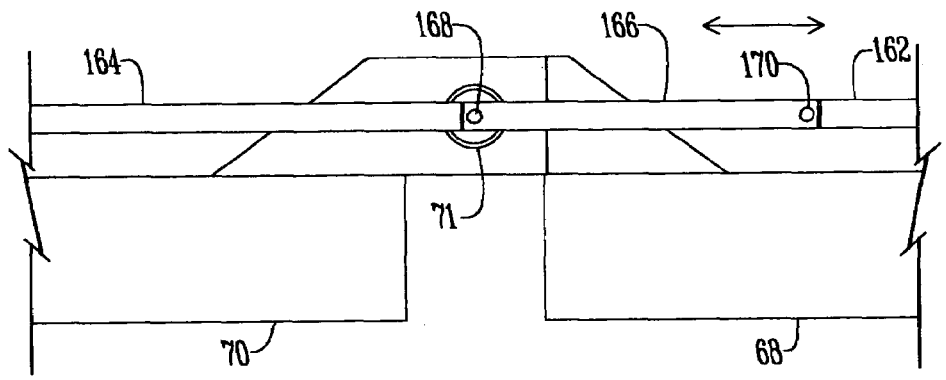
FIG. 22 is a side elevational view of the rake arm pivotal connection showing the lift tube moved to the right.
Figure 23:
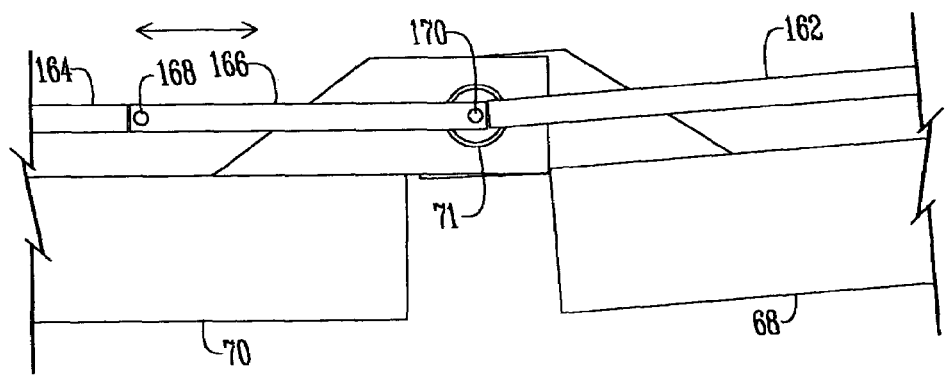
FIG. 23 is a view similar to FIG. 22 but the lift tube is moved to the left across the rake arm pivotal connection.

The lift tube 142 includes a pair of tube portions 162 and 164 interconnected by a hinge tube portion 166, as shown in FIGS. 22 and 23. The opposite pivotal axes 168 and 170 for the hinge tube portion 166 are alternately positioned coaxially with the axis of the rake arm hinge 71 as the lift tube 142 shifts forward or backward for raising or lowering the raking wheels 144. Because of hinge tube portion 166, the lift tube 142 can fold upward along with the forward rake arm 68 about hinge 71 without bending or otherwise damaging the lift tube 142. The cylinder 148 is located forward of hinge 71 and hinge tube portion 166, as shown in FIG. 21, such that cylinder 148 pulls the lift tube 142 in the forward direction.

In operation, hay rake 10 moves from a storage mode, as shown in FIG. 1, to an operational mode, as shown in FIG. 20. Once the hay rake 10 is in the operational mode, the raking wheels 144 can be lowered such that the wheels 144 engage with the ground surface. To lower the raking wheels 144, the cylinder rod 154 is extended from hydraulic cylinder 148, thereby allowing lift tube 142 to translationally shift rearward with respect to rake arm 68. As lift tube 142 shifts rearwardly, the raking wheels 144 will lower towards the ground surface. When the raking wheels 144 are in the lowered position, the wheels 144 are able to cut the hay and otherwise perform the objectives of a hay rake device.

When an operator desires to return the hay rake 10 to the storage mode, the raking wheels 144 must first be raised. To raise the raking wheels 144, cylinder rod 154 is retracted forwardly within cylinder 148. As the cylinder rod 154 retracts, sleeve 156 slides forwardly and engages with the collar 160, thereby pulling the life tube 142 forwardly. As the lift tube 142 moves forwardly, the raking wheels 144 will be raised from the ground surface. Once the raking wheels 144 are raised, the rake arms 68 and 70 of the foldable hay rake 10 may be drawn in such that the hay rake achieves the storage mode position shown in FIG. 1.

With reference to FIGS. 24-27, an alternative embodiment of the present invention is shown where foldable hay rake 10 is shown with a base frame 12, trailing arms 50, forward rake arm portions 68, rearward rake arm portions 70, lift tubes 142, raking wheels 144, and cylinders 148. A center kicker wheel assembly 172 is pivotally associated with the base frame 12 at the rearward end 16 of the base frame 12. It is the configuration and operation of center kicker wheel assembly 172 that is the focus of this embodiment, as will be discussed hereinafter. It will be appreciated to those skilled in the art that while the center kicker wheel assembly 172 described herein is disclosed for use with a foldable hay rake of novel design, the center kicker wheel assembly 172 can be used with any conventional hay rake assembly.

Figure 24:
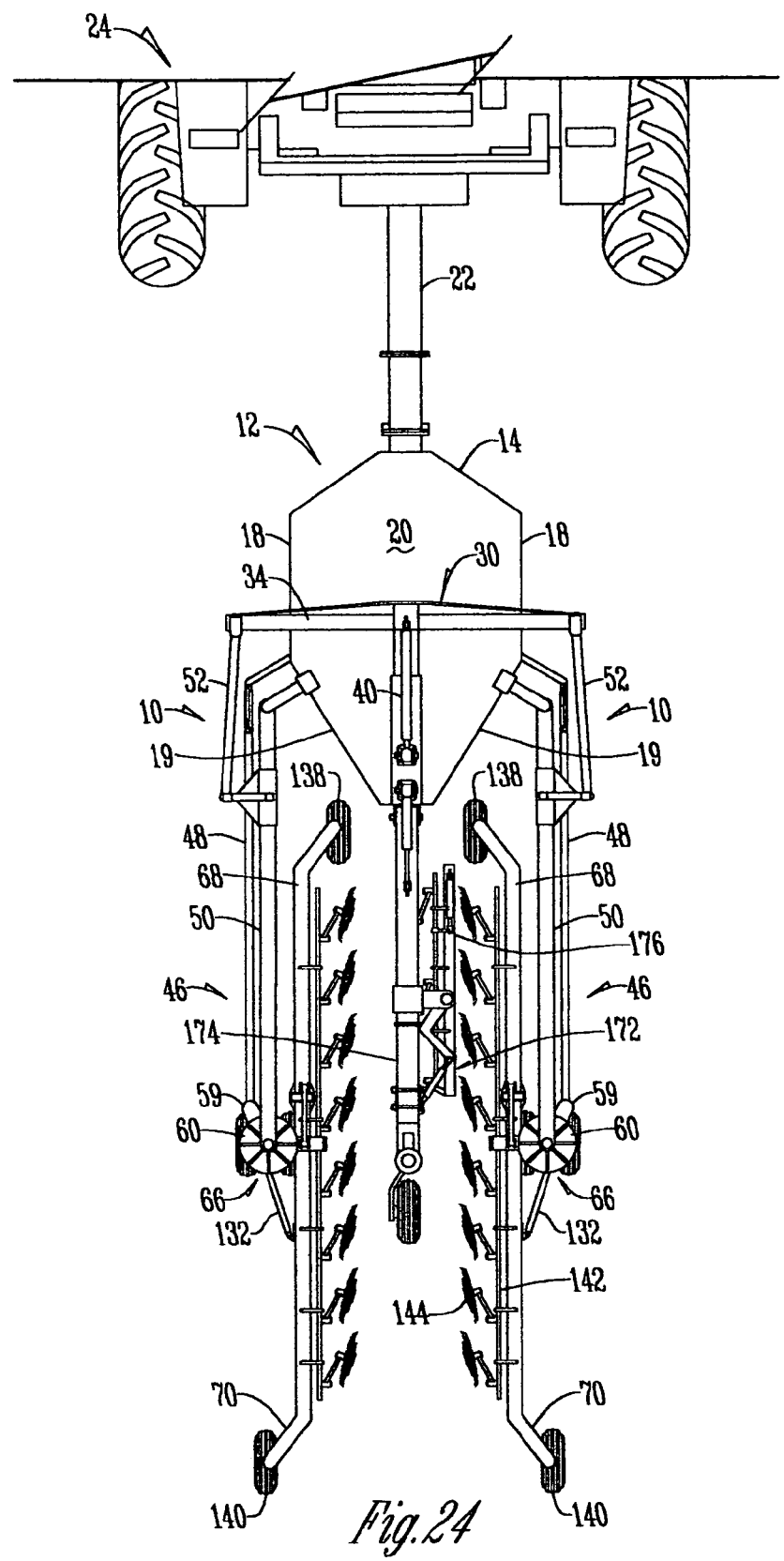
FIG. 24 is view similar to FIG. 1 but shows an alternative embodiment of the present invention.
Figure 25:
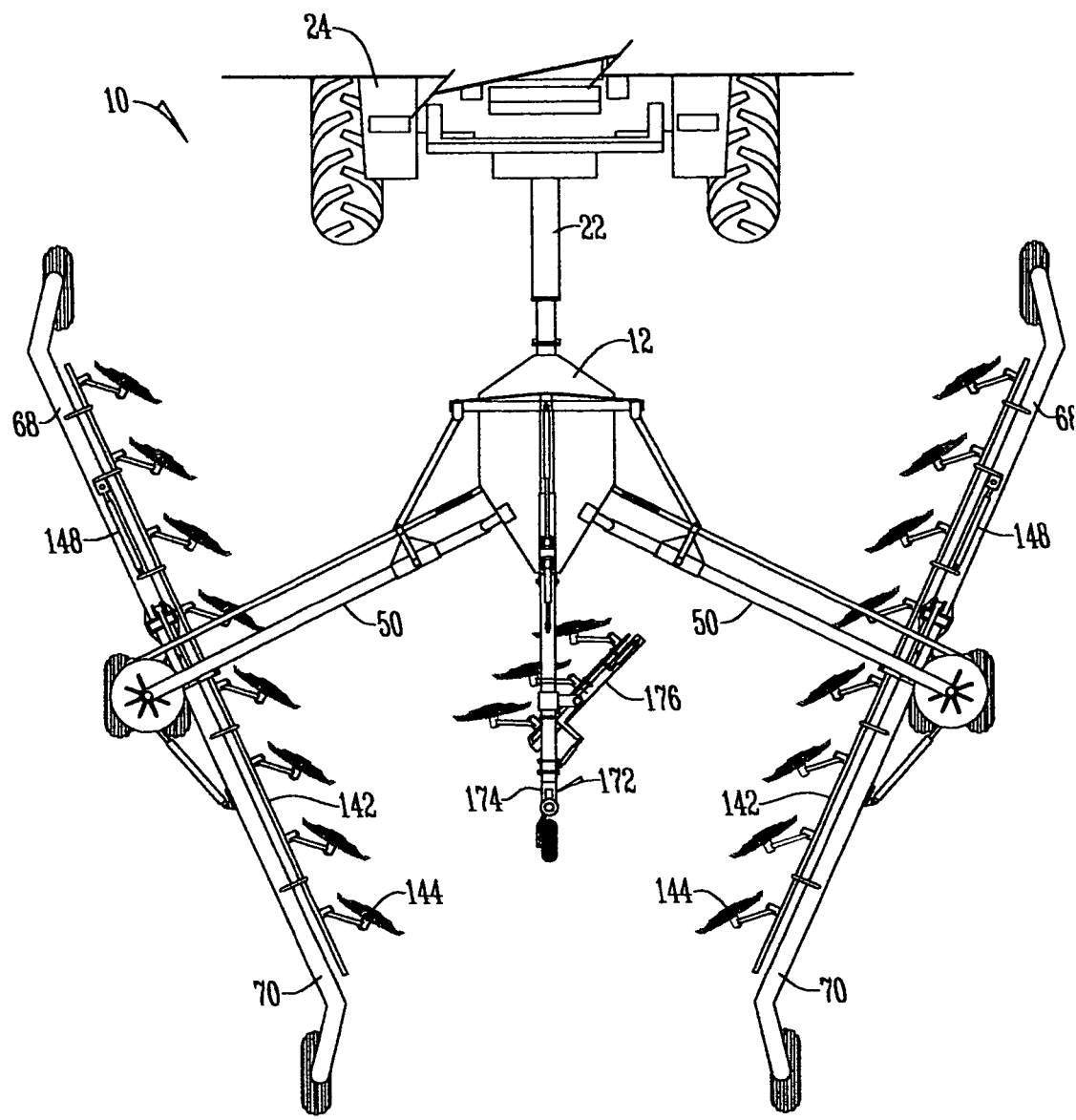
FIG. 25 is view similar to FIG. 3 but shows an alternative embodiment of the present invention in an operational position.

With reference to FIGS. 24 and 25, the center kicker wheel assembly 172 includes a main support frame 174 having an inner and outer end with the inner end attached to the base frame 12. A center rake arm structure 176 is pivotally secured to the main support frame 174 and located adjacent the rearward end of the base frame 12 between the rake arm portions 68/70. As the rake arm portions 68/70 move from the travel position in FIG. 24 to the raking position of FIG. 25, as described above with respect to FIGS. 1, 3 and 20, the center rake arm structure 176 likewise pivots with respect to the main support frame 174 from the travel position in FIG. 24 to the raking position of FIG. 25.

Figure 26:
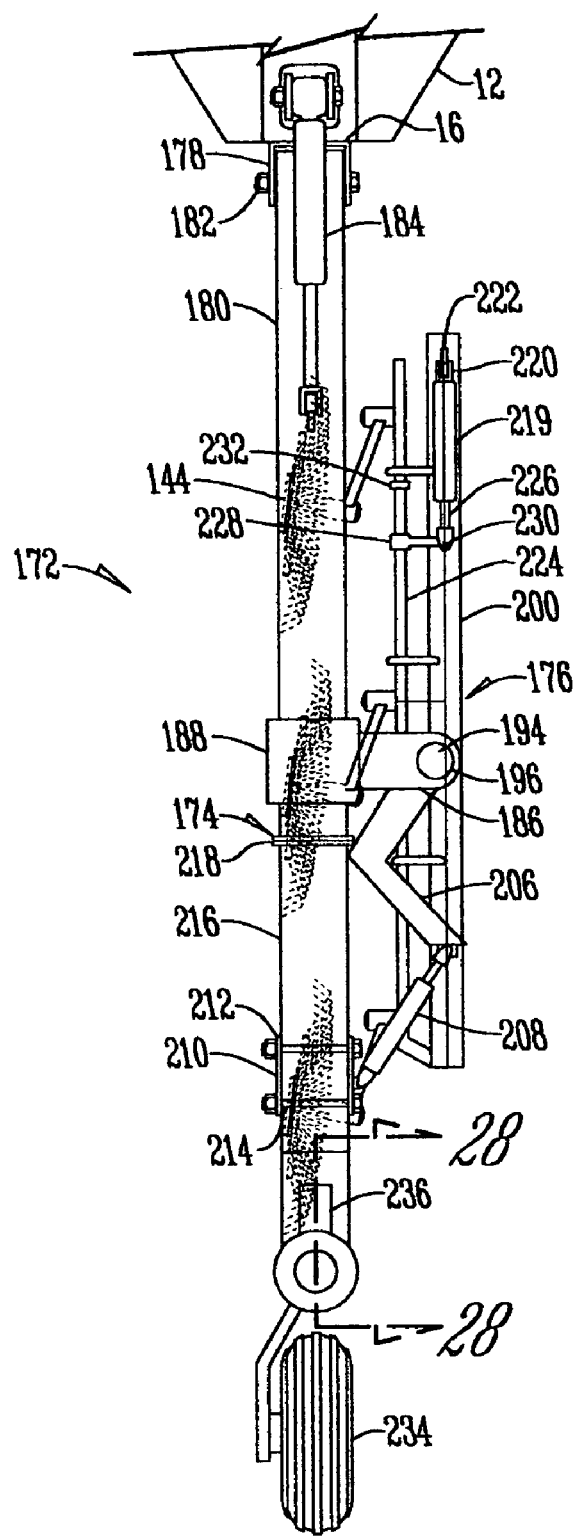
FIG. 26 is a top view of the center kicker wheel assembly of the present invention.
Figure 27:
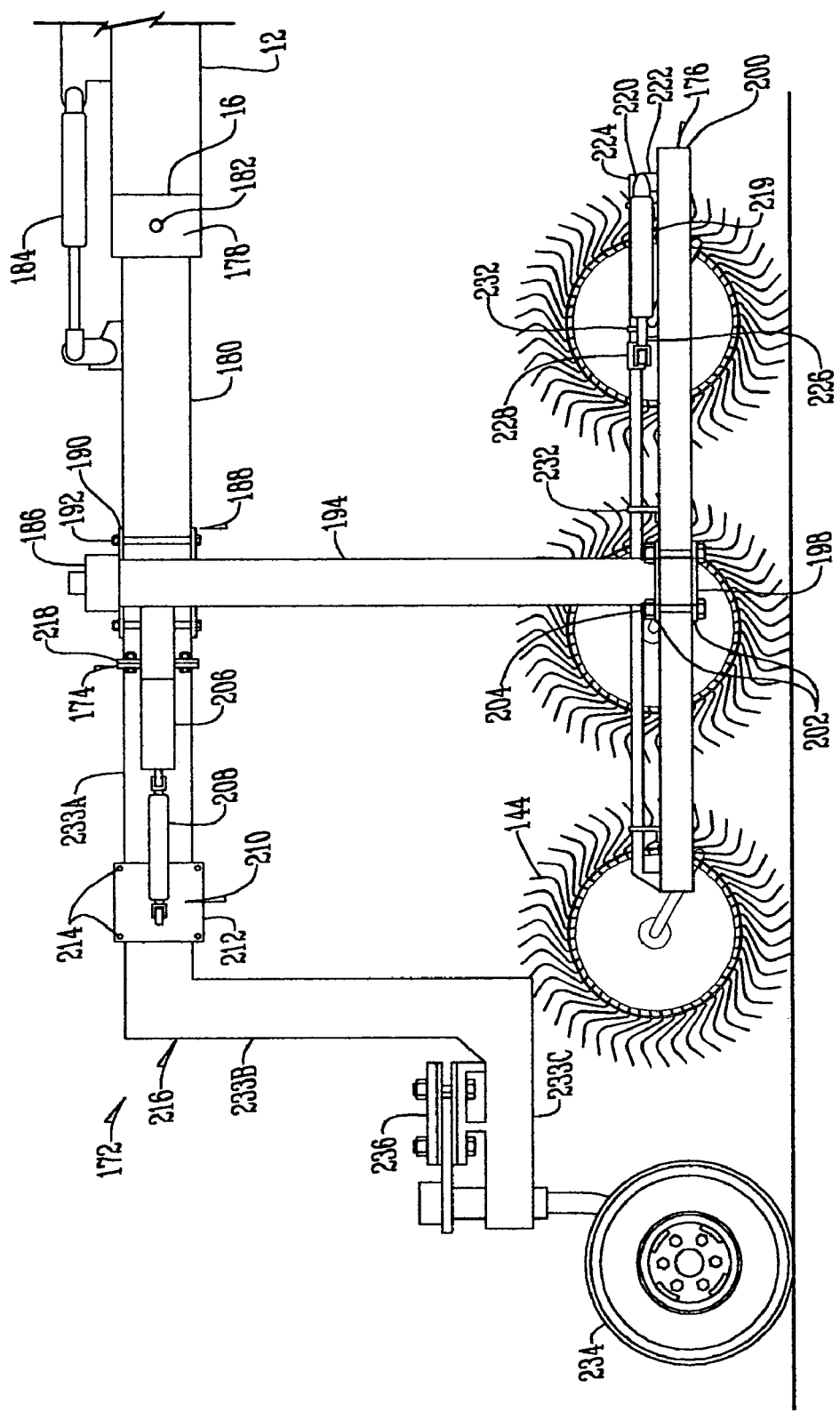
FIG. 27 is a side view of the center kicker wheel assembly of the present invention.

With reference to FIGS. 26 and 27, a clevis 178 extends from the rearward end 16 of the base frame 12 and hingedly connects the base frame to an inner end 180 of the main support frame 174 with a pin 182 received through both the clevis 178 and the inner end 180 of the main support frame 174. A hydraulic cylinder and rod 184 is connected between the inner end 180 of the main support frame 174 and the base frame 12 to raise and lower the main support frame 174 with respect to the base frame 12.

An extension arm 186 is attached to and extends transversely from the main support frame 174. A plate fastener 188 adjustably attaches the extension arm 186 to the main support frame 174 and includes a pair of plates 190 in spaced alignment located on opposite sides of the main support frame 174, where the plates 190 are secured to each other to squeeze the main support frame 174 via bolts 192 extending between the plates 190.

A turn rod 194 rotatably associates the center rake arm structure 176 with the extension arm 186. The turn rod 194 is rotatably received within a sleeve 196 formed within the extension arm 186. The turn rod 194 terminates in a plate fastener 198 that adjustably attaches the turn rod 194 to a frame 200 of the center rake arm structure 176 and includes a pair of plates 202 in spaced alignment located on opposite sides of the center rake arm frame 200, where the plates 202 are secured to each other to squeeze the center rake arm frame 200 via bolts 204 extending between the plates 202.

A v-shaped lever arm 206 extends outwardly from the turn rod 194. A hydraulic cylinder 208 is attached between the lever arm 206 and the main support frame 174 to actuate the v-shaped lever arm 206 and turn rod 194 to pivot the center rake arm structure 176 with respect to the main support frame 174. The end of the hydraulic cylinder 208 free of the v-shaped lever arm 206 terminates in a plate fastener 210 that adjustably attaches the hydraulic cylinder 208 to main support frame 174 and includes a pair of plates 212 in spaced alignment located on opposite sides of the main support frame 174, where the plates 212 are secured to each other to squeeze the main support frame 174 via bolts 214 extending between the plates 212.

The inner end 180 and outer end 216 of main support frame 174 are separate pieces attached at a joint 218 therebetween. The extension arm 186 is optionally attached to the inner end 180 of the main support frame 174 by plate fastener 188 and the hydraulic cylinder 208 is attached to the outer end 216 of the main support frame 174 by plate fastener 210.

A hydraulic cylinder 219 includes a fixed end 220 that is pinned to frame 200 of the center rake arm structure 176 at a bracket 222. Bracket 222 is rigidly mounted to the center rake arm frame 200 yet does not restrain the translational movement of a lift tube 224. Hydraulic cylinder 219 also includes a cylinder rod 226. Cylinder rod 226 attaches to a sleeve 228 via pin 230. Sleeve 228 slides about lift tube 224 and is limited in the forward direction by a collar 232. Retracting cylinder rod 226 causes the cylinder 219 to pull the lift tube 224 forwardly. Similarly, extending the cylinder rod 226 allows the lift tube 224 to shift rearwardly. It should be noted that cylinder 219 may be positioned as shown in FIGS. 26 and 28; alternatively, cylinder 219 may be flipped end-for-end from that shown in FIGS. 26 and 28 without altering the performance of the cylinder 219.

In operation, hay rake 10 moves from a storage mode, as shown in FIG. 24, to an operational mode, as shown in FIG. 25. Once the hay rake 10 is in the operational mode, the raking wheels 144 can be lowered such that the wheels 144 engage with the ground surface. To lower the raking wheels 144, the cylinder rod 226 is extended from hydraulic cylinder 219, thereby allowing lift tube 224 to translationally shift rearward with respect to center rake arm frame 200. As lift tube 224 shifts rearwardly, the raking wheels 144 will lower towards the ground surface. When the raking wheels 144 are in the lowered position, the wheels 144 are able to rake the hay and otherwise perform the objectives of a hay rake device.

When an operator desires to return the hay rake 10 to the storage mode, the raking wheels 144 must first be raised. To raise the raking wheels 144, cylinder rod 226 is retracted forwardly within cylinder 219. As the cylinder rod 219 retracts, sleeve 228 slides forwardly and engages with the collar 232, thereby pulling the life tube 224 forwardly. As the lift tube 224 moves forwardly, the raking wheels 144 will be raised from the ground surface. Once the raking wheels 144 are raised, the center rake arm frame 200 of the foldable hay rake 10 may be rotated in such that the hay rake achieves the storage mode position shown in FIG. 24.

Figure 28:
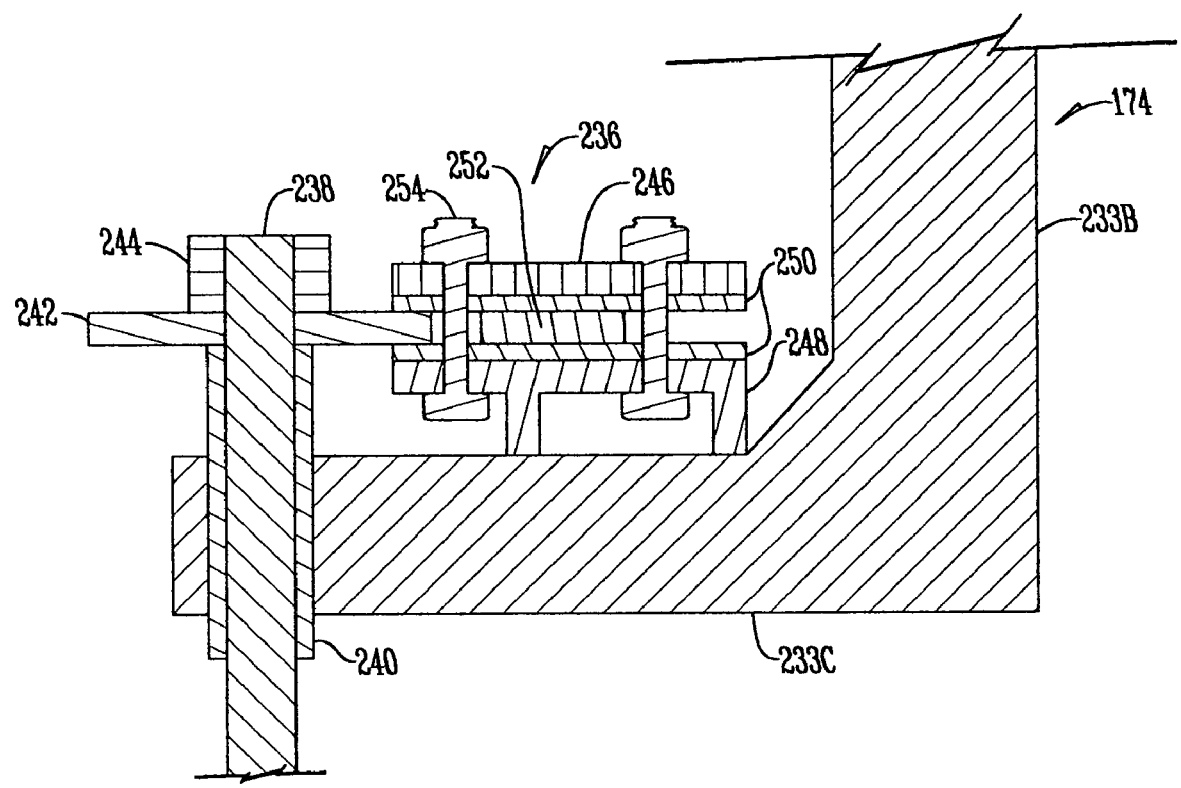
FIG. 28 is a side sectional view of the center kicker wheel assembly of the present invention taken along line 28-28 of FIG. 26.

With reference to FIGS. 27 and 28, the outer end 216 of the main support frame 174 includes a first horizontal portion 233A extending laterally from the joint 218, a vertical leg 233B extending downwardly therefrom, and a horizontal tail 233C extending horizontally parallel to the ground from the lower end of the vertical leg 233B.

A castor wheel 234 is pivotally attached to the horizontal tail 233C of the main support frame 174. The castor wheel 234 includes an axle shaft 238 rotatably received within a sleeve 240 on the horizontal tail 233C of the main support frame 174. A disk 242 is positioned around the axle shaft 238 and between the sleeve 240 and a cap 244 fixedly secured to the axle shaft 238.

An axle dampener 236 is attached to the horizontal tail 233C of the main support frame 174. The axle dampener 236 includes a top clamp 246. A base 248 is located beneath the top clamp 246 and is integrally formed with the horizontal tail 233C of the main support frame 174. At least one plastic plate 250 and spacer 252 are located between the top clamp 246 and the base 248. The top clamp 246 is secured above the base 248, plastic plate 250, and spacer 252 with fasteners 254 extending through the top clamp 246, base 248, plastic plate 250, and spacer 252. The base 248 is preferably formed of metallic material, such as welded steel for example.

The axle dampener 236 contacts the disk 242 to be operationally associated with the castor wheel 234. Specifically, the two plastic plates 250 are positioned above and below the disk 242 to pinch the disk 242 and dampen wobbling of the castor wheel 234.

Figure 29:
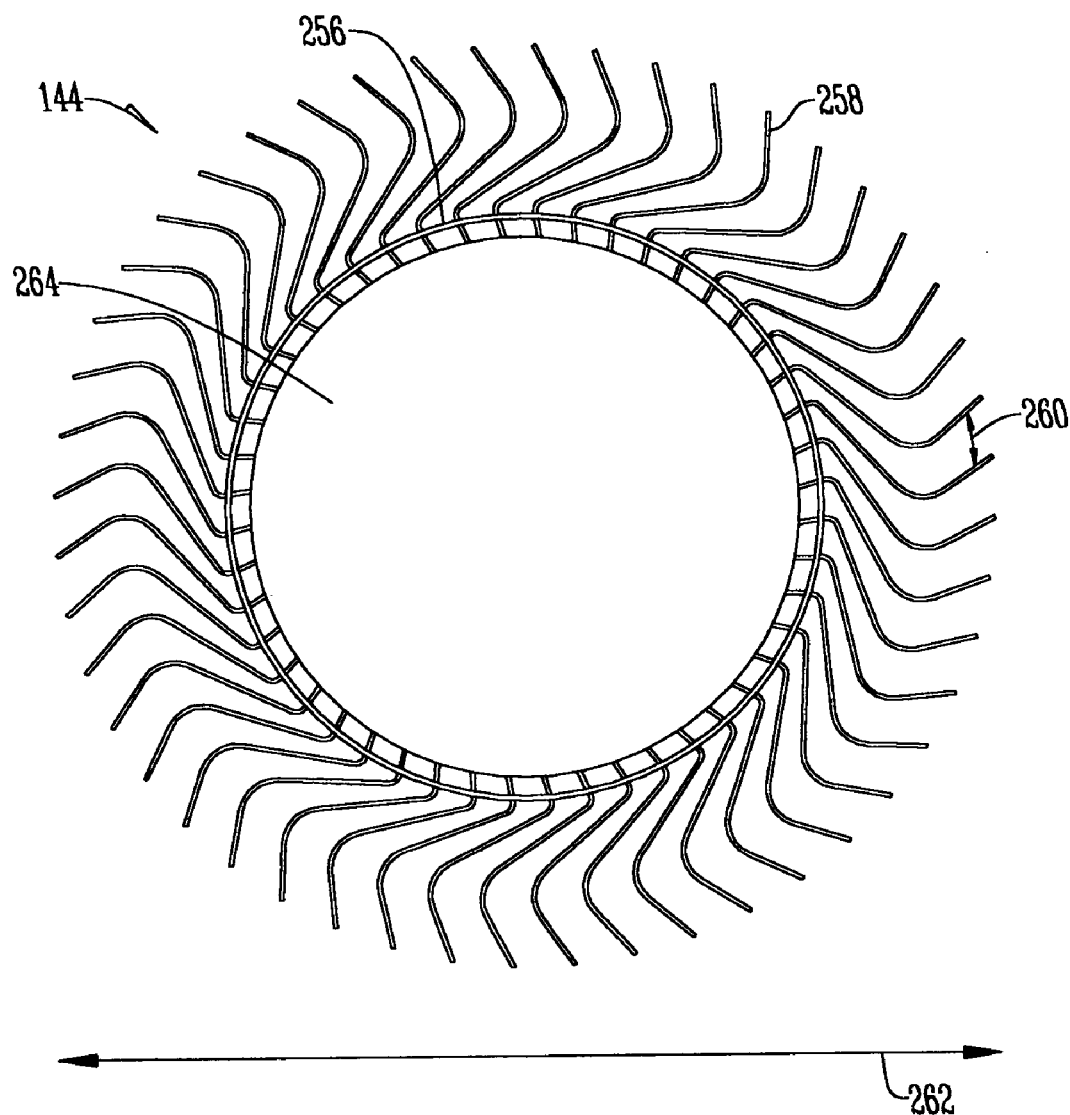
FIG. 29 is a side view of a hay rake wheel of the present invention.

With reference to FIG. 29, as described above a plurality of hay rake wheels 144 are secured to the first, second, and center rake arm structures. The hay rake wheels 144 optionally include a rim 256, a plurality of teeth 258 extending from the rim 256, and a tooth spacing 260 between adjacent teeth less than five inches. The tooth spacing 260 between adjacent teeth is optionally about 4 inches. Additionally, the hay rake wheels 144 optionally have an outer diameter 262 greater than 60 inches. The outer diameter 262 is optionally about 62 inches. A wind guard cover 264 may be affixed to the hay rake wheels 144 within the rim 256 to prevent hay from blowing through the hay rake wheels 144. Where the outer diameter 262 is 62 inches, and the tooth spacing 260 is about 4 inches, a total of about 48 tines will be supplied on hay rake wheel 144.

It is therefore seen that by the use of a hydraulic cylinder that pulls on the forward end of the lift tube, this invention permits the raising of the individual raking wheels without bending the lift tube or otherwise damaging the foldable hay rake.

It is therefore seen that this invention will achieve at least all of its stated objectives.

What is claimed is:

1. A foldable hay rake, comprising,
a base frame member having forward and rearward ends, and opposite sides,
a pair of elongated wing arms having inner and outer ends with the inner ends being adjustably secured to the base frame and being adapted to swing outwardly with respect to the base frame,
an elongated hay rake arm structure pivotally secured to the outer ends of the wing arms, and having a midsection and forward and rearward ends,
a plurality of hay rake wheels secured to the hay rake arm structure,
a main support frame having an inner and outer end with the inner end attached to the base frame,
a center rake arm structure pivotally secured to the support frame about a turn rod such that the the center rake arm structure rotates in vertical spaced relation to the support frame and having a midsection and forward and rearward ends,
a plurality of hay rake wheels secured to the center rake arm structure; and
each wing arm being operatively connected by its outer end to a vertically disposed post connected to positioning wheels pivotally secured to the midsection of the hay rake arm structure.

2. The foldable hay rake of claim 1 further comprising: a tongue member secured to the forward end of the base frame for securing the hay rake to a prime mover.

3. The foldable hay rake of claim 1 further comprising: caster wheels pivotally secured to the hay rake arm structure, adjacent its forward and rearward ends.

4. The foldable hay rake of claim 3 further comprising:
the wing arms each being comprised of a spaced beam and strut in parallel relation to form a parallelogram configuration,
wherein each vertically disposed post holds the positioning wheels in a forwardly extending direction regardless of the pivotal position of the hay rake arm structure with respect to the base frame and the wing arms, and
power means for pivoting the wing arms with respect to the base frame.

5. The foldable hay rake of claim 4 wherein second power means are connected to the hay rake arms and the posts for pivoting the hay rake arms with respect to the posts.

6. The foldable hay rake of claim 1 wherein the wing arms are pivotal between positions approximately parallel to the sides of the base frame in a travel mode to a V-shape configuration with respect to each other of less than 90° in an operational mode.

7. The foldable hay rake of claim 3 wherein the hay rake arms are comprised of a plurality of separate beam sections, with the position wheels being mounted on a center portion thereof, and castor wheels being mounted on the forward and rearward ends of the endmost beam sections.

8. The foldable hay rake of claim 4 wherein the hay rake arms are comprised of separate arm members pivotally secured to a pivotal assembly secured to the post above the positioning wheels.

9. The foldable hay rake of claim 8 wherein the arm members can pivot in vertical and horizontal planes with respect to the pivotal assembly.

10. The foldable hay rake of claim 1 further comprising:
a laterally extending beam on the base frame member,
power means for moving the laterally extending beam in a forward or rearward direction with respect to the base frame, and
elongated tie rods connecting outer ends of the laterally extending beam to the wing arms to pivot the wing arms from a position approximately parallel to the sides of the base frame to and from an outwardly and diagonally extended position from the base frame to adjust the distance between the posts and the positioning wheels on the opposite ends of the wing arms.

11. The foldable hay rake of claim 1 further comprising:
a pivotal assembly mounted on each of said post above said positioning wheels,
the pivotal assembly including horizontal and vertical subframes pivotally secured together about a vertical axis,
the vertical subframe being pivotally secured to the rake arm structure about a horizontal axis,
the hay rake arm structure being comprised of at least two arm members pivotally secured at inner ends to pivot about a horizontal axis, and
one of the arm members being pivotally secured about a horizontal axis to the vertical subframe adjacent its inner end.

12. The foldable hay rake of claim 1 further comprising:
the wing arms each being comprised of a spaced beam and strut in parallel relation to form a parallelogram configuration, and
power means for pivoting the wing arms with respect to the base frame.

13. The foldable hay rake of claim 1 further comprising:
a lift tube having forward and rearward portions slidably mounted to each elongated hay rake arm in parallel fashion and being hingedly attached to the plurality of raking wheels; and
a hydraulic cylinder with a fixed end attached to the forward end of each elongated hay rake arm having an extendable cylinder rod attached to the lift tube, and wherein the cylinder is positioned to pull the lift tube and raise the raking wheels.

14. A foldable hay rake, comprising,
a base frame member having forward and rearward ends, and opposite sides,
a first and second rake arm structure pivotally associated with the base frame with the first and second elongated hay rake arms located on opposite sides of the base frame member,
a center rake arm structure pivotally associated with the base frame with the center rake arm located adjacent the rearward end of the base frame member between the first and second rake arm structures,
a plurality of hay rake wheels secured to the first, second, and center rake arm structures,
a main support frame having an inner and outer end with the inner end attached to the base frame, wherein the center rake arm structure is pivotally secured to the main support frame, and
wherein an extension arm is attached to and extends transversely from the main support frame, a turn rod rotatably associates the center rake arm structure with the extension arm.

15. The foldable hay rake of claim 14, wherein at least one of the hay rake wheels has a plurality of teeth extending therefrom with a tooth spacing between adjacent teeth of less than five inches.

16. The foldable hay rake of claim 14, wherein at least one of the hay rake wheels has an outer diameter greater than 60 inches.

17. The foldable hay rake of claim 14, further comprising a castor wheel pivotally attached to the outer end of the main support frame, the castor wheel adapted to rotationally contact the ground.

18. The foldable hay rake of claim 17, further comprising an axle dampener attached to the outer end of the main support frame and operationally associated with the castor wheel to dampen wobbling of the castor wheel, wherein the castor wheel includes an axle shaft rotatably received within a sleeve on the outer end of the main support frame, a disk is positioned around the axle shaft, and the axle dampener contacts the disk to be operationally associated with the castor wheel.

19. The foldable hay rake of claim 18, wherein the axle dampener includes a pair of plastic plates positioned above and below the disk, a metallic base located beneath the plastic plates and secured to the outer end of the main support frame, and a top clamp pinching the plastic plates together about the disk.

20. The foldable hay rake of claim 14, wherein a hydraulic cylinder is connected between the inner end of the main support frame and the base frame to raise and lower the main support frame with respect to the base frame.

21. The foldable hay rake of claim 14, wherein a v-shaped lever arm extends outwardly from the turn rod, a hydraulic cylinder is attached between the lever arm and the main support frame to actuate the v-shaped lever arm and turn rod to pivot the center rake arm.

22. The foldable hay rake of claim 21, wherein the inner and outer ends of main support frame are separate pieces attached at a joint therebetween.

23. The foldable hay rake of claim 22, wherein the extension arm is attached to the inner end of the main support frame and the hydraulic cylinder is attached to the outer end of the main support frame.

24. A foldable hay rake, comprising,
a base frame member having forward and rearward ends, and opposite sides,
a pair of elongated wing arms having inner and outer ends with the inner ends being adjustably secured to the base frame and being adapted to swing outwardly with respect to the base frame,
an elongated hay rake arm structure pivotally secured to the outer ends of the wing arms, and having a midsection and forward and rearward ends,
a plurality of hay rake wheels secured to the hay rake arm structure,
a main support frame having an inner and outer end with the inner end attached to the base frame,
a center rake arm structure pivotally secured to the support frame, and having a midsection and forward and rearward ends,
a plurality of hay rake wheels secured to the center rake arm structure,
a laterally extending beam on the base frame member, the beam operatively connected to the wing arms, and
power means for moving the laterally extending beam in a forward or rearward direction with respect to the base frame.

25. The foldable hay rake of claim 24 further comprising:
positioning wheels pivotally secured to the midsection of the hay rake arm structure, and
elongated tie rods connecting outer ends of the laterally extending beam to the wing arms to pivot the wing arms from a position approximately parallel to the sides of the base frame to and from an outwardly and diagonally extended position from the base frame to adjust the distance between the positioning wheels on the opposite ends of the wing arms.

* * * * *